US012386741B2

(12) United States Patent
Liu et al.

(10) Patent No.: US 12,386,741 B2
(45) Date of Patent: Aug. 12, 2025

(54) MEMORY CONTROLLER, MEMORY SYSTEM, AND METHOD FOR MANAGING LOGICAL-TO-PHYSICAL MAPPING TABLE BASED ON ADDRESS BOUNDARY

(71) Applicant: YANGTZE MEMORY TECHNOLOGIES CO., LTD., Wuhan (CN)

(72) Inventors: Weilin Liu, Wuhan (CN); Dili Wang, Wuhan (CN)

(73) Assignee: YANGTZE MEMORY TECHNOLOGIES CO., LTD., Wuhan (CN)

( * ) Notice: Subject to any disclaimer, the term of this patent is extended or adjusted under 35 U.S.C. 154(b) by 0 days.

(21) Appl. No.: 18/219,583

(22) Filed: Jul. 7, 2023

(65) Prior Publication Data

US 2024/0411690 A1    Dec. 12, 2024

Related U.S. Application Data

(63) Continuation of application No. PCT/CN2023/099321, filed on Jun. 9, 2023.

(51) Int. Cl.
*G06F 12/02* (2006.01)

(52) U.S. Cl.
CPC .. *G06F 12/0292* (2013.01); *G06F 2212/1024* (2013.01); *G06F 2212/2022* (2013.01); *G06F 2212/214* (2013.01); *G06F 2212/7201* (2013.01)

(58) Field of Classification Search
CPC ......... G06F 12/0292; G06F 2212/1024; G06F 2212/2022; G06F 2212/214; G06F 2212/7201
See application file for complete search history.

(56) References Cited

U.S. PATENT DOCUMENTS

| 9,529,547 | B2 * | 12/2016 | Staudenmaier | G06F 12/14 |
| 2006/0107130 | A1 * | 5/2006 | Baker | G06F 11/1004 714/710 |
| 2010/0161308 | A1 * | 6/2010 | Norman | G11C 13/004 703/23 |
| 2015/0261662 | A1 * | 9/2015 | Loh | G06F 12/0284 711/170 |
| 2017/0309343 | A1 * | 10/2017 | Lim | G11C 16/26 |
| 2020/0201573 | A1 * | 6/2020 | Kwak | G06F 3/0685 |
| 2021/0049097 | A1 * | 2/2021 | Fang | G06F 3/0644 |
| 2021/0064622 | A1 | 3/2021 | Lee et al. | |
| 2021/0334204 | A1 | 10/2021 | Kim | |

FOREIGN PATENT DOCUMENTS

CN    114416781 A    4/2022

OTHER PUBLICATIONS

International Search Report issued in corresponding International Application No. PCT/CN2023/099321, mailed Feb. 19, 2024, 3 pages.

* cited by examiner

*Primary Examiner* — Edward J Dudek, Jr.
(74) *Attorney, Agent, or Firm* — BAYES PLLC

(57) ABSTRACT

In certain aspects, a memory controller includes a logical-to-physical (L2P) search engine. The L2P search engine is configured to maintain an L2P mapping table that maps logical addresses to physical addresses, respectively. The L2P search engine is also configured to organize the physical addresses mapped by the L2P mapping table into address categories based on at least one address boundary.

20 Claims, 15 Drawing Sheets

MEMORY CONTROLLER, MEMORY SYSTEM, AND METHOD FOR MANAGING LOGICAL-TO-PHYSICAL MAPPING TABLE BASED ON ADDRESS BOUNDARY

CROSS-REFERENCE TO RELATED APPLICATIONS

This application is a continuation of International Application No. PCT/CN2023/099321, filed on Jun. 9, 2023, entitled "MEMORY CONTROLLER, MEMORY SYSTEM MANAGING LOGICAL-TO-PHYSICAL MAPPING TABLE, METHOD, AND STORAGE MEDIUM THEREOF," which is incorporated herein by reference in its entirety.

BACKGROUND

The present disclosure relates to memory devices and operation methods thereof.

Solid-state drives (SSDs) are a type of non-volatile data storage devices that have gained significant popularity in recent years due to their numerous advantages over traditional hard disk drives (HDDs), such as faster read and write speed, durability and reliability, reduced power consumption, silent operation, and smaller form factors. SSDs typically may use NAND Flash memory for non-volatile storage. Some SSDs, for example enterprise SSDs, also may use volatile memory (e.g., dynamic random-access memory (DRAM)) to enhance their performance, allowing faster access to data and more efficient handling of read and write operations.

SUMMARY

In one aspect, a memory controller includes a logical-to-physical (L2P) search engine. The L2P search engine is configured to maintain an L2P mapping table that maps logical addresses to physical addresses, respectively. The L2P search engine is further configured to organize the physical addresses mapped by the L2P mapping table into address categories based on at least one address boundary.

In some implementations, the at least one address boundary includes a first address boundary; and the memory controller further includes a first register configured to store the first address boundary.

In some implementations, the address categories include a first category of user data addresses mapping to memory regions of a user area of a non-volatile memory device and a second category of volatile memory addresses mapping to memory blocks of a volatile memory device.

In some implementations, the L2P mapping table maps a first set of logical addresses in the logical addresses to a first set of physical addresses associated with the memory regions of the user area of the non-volatile memory device, respectively, and the first category of user data addresses includes the first set of physical addresses associated with the memory regions of the user area of the non-volatile memory device. The L2P mapping table also maps a second set of logical addresses in the logical addresses to identifiers (IDs) of the memory blocks of the volatile memory device, respectively, and the second category of volatile memory addresses includes the IDs of the memory blocks of the volatile memory device.

In some implementations, each user data address in the first category is greater than the first address boundary; and each volatile memory address in the second category is smaller than the first address boundary.

In some implementations, the at least one address boundary further includes a second address boundary lower than the first address boundary; and the memory controller further includes a second register configured to store the second address boundary.

In some implementations, the address categories further include a third category of specialized memory addresses mapping to memory regions of a system area of the non-volatile memory device. The L2P mapping table also maps a third set of logical addresses in the logical addresses to a third set of physical addresses associated with the memory regions of the system area of the non-volatile memory device, respectively, and the third category of specialized memory addresses includes the third set of physical addresses associated with the memory regions of the system area of the non-volatile memory device.

In some implementations, each volatile memory address in the second category is greater than or equal to the second address boundary and smaller than or equal to the first address boundary; and each specialized memory address in the third category is smaller than the second address boundary.

In some implementations, the memory controller further includes a volatile memory device interface operatively coupled to the volatile memory device and a non-volatile memory device interface operatively coupled to the non-volatile memory device.

In some implementations, the volatile memory device includes dynamic random-access memory (DRAM), and the non-volatile memory device includes NAND Flash memory.

In some implementations, responsive to a read request indicative of retrieving a piece of data associated with a logical address, the L2P search engine is further configured to determine an address of an entry in the L2P mapping table based on the logical address, identify a physical address stored in the entry of the L2P mapping table based on the address of the entry, determine an address category which the physical address is classified into based on the first address boundary and the second address boundary, and instruct to fetch the piece of data from one of the volatile memory device and the non-volatile memory device based on the address category.

In some implementations, to determine the address category, the L2P search engine is further configured to, responsive to the physical address being greater than the first address boundary, determine that the physical address is classified into the first category of user data addresses mapping to the memory regions of the user area of the non-volatile memory device. Responsive to the physical address being lower than the second address boundary, the L2P search engine is further configured to determine that the physical address is classified into the third category of specialized memory addresses mapping to the memory regions of the system area of the non-volatile memory device. Or, responsive to the physical address being equal to or greater than the second address boundary and being equal to or smaller than the first address boundary, the L2P search engine is further configured to determine that the physical address is classified into the second category of volatile memory addresses mapping to the memory blocks of the volatile memory device.

In some implementations, to instruct to fetch the piece of data, the L2P search engine is further configured to, responsive to the physical address being classified into the third category of specialized memory addresses or the first category of user data addresses, instruct to read the piece of data from the non-volatile memory device using the physical address. Or, responsive to the physical address being classified into the second category of volatile memory addresses, the L2P search engine is further configured to instruct to fetch the piece of data from the volatile memory device using the physical address.

In another aspect, a memory system includes a non-volatile memory device including memory regions each associated with a physical address and a memory controller operatively coupled to the non-volatile memory device. The memory controller is configured to control the non-volatile memory device. The memory controller includes an L2P search engine. The L2P search engine is configured to maintain an L2P mapping table that maps logical addresses to physical addresses, respectively, and organize the physical addresses mapped by the L2P mapping table into address categories based on at least one address boundary.

In some implementations, the at least one address boundary includes a first address boundary; and the memory controller further includes a first register configured to store the first address boundary.

In some implementations, the address categories include a first category of user data addresses mapping to memory regions of a user area of a non-volatile memory device and a second category of volatile memory addresses mapping to memory blocks of a volatile memory device.

In some implementations, the L2P mapping table maps a first set of logical addresses in the logical addresses to a first set of physical addresses associated with the memory regions of the user area of the non-volatile memory device, respectively, and the first category of user data addresses includes the first set of physical addresses associated with the memory regions of the user area of the non-volatile memory device. The L2P mapping table also maps a second set of logical addresses in the logical addresses to IDs of the memory blocks of the volatile memory device, respectively, and the second category of volatile memory addresses includes the IDs of the memory blocks of the volatile memory device.

In some implementations, each user data address in the first category is greater than the first address boundary; and each volatile memory address in the second category is smaller than the first address boundary.

In some implementations, the L2P mapping table is stored in the volatile memory device.

In some implementations, the at least one address boundary further includes a second address boundary lower than the first address boundary; and the memory controller further includes a second register configured to store the second address boundary.

In some implementations, the address categories further include a third category of specialized memory addresses mapping to memory regions of a system area of the non-volatile memory device. The L2P mapping table also maps a third set of logical addresses in the logical addresses to a third set of physical addresses associated with the memory regions of the system area of the non-volatile memory device, respectively, and the third category of specialized memory addresses includes the third set of physical addresses associated with the memory regions of the system area of the non-volatile memory device.

In some implementations, each volatile memory address in the second category is greater than or equal to the second address boundary and smaller than or equal to the first address boundary; and each specialized memory address in the third category is smaller than the second address boundary.

In some implementations, the memory controller further includes a volatile memory device interface operatively coupled to the volatile memory device and a non-volatile memory device interface operatively coupled to the non-volatile memory device.

In some implementations, the volatile memory device includes DRAM, and the non-volatile memory device includes NAND Flash memory.

In some implementations, responsive to a read request indicative of retrieving a piece of data associated with a logical address, the L2P search engine is further configured to determine an address of an entry in the L2P mapping table based on the logical address, identify a physical address stored in the entry of the L2P mapping table based on the address of the entry, determine an address category which the physical address is classified into based on the first address boundary and the second address boundary, and instruct to fetch the piece of data from one of the volatile memory device and the non-volatile memory device based on the address category.

In some implementations, to determine the address category, the L2P search engine is further configured to, responsive to the physical address being greater than the first address boundary, determine that the physical address is classified into the first category of user data addresses mapping to the memory regions of the user area of the non-volatile memory device. Responsive to the physical address being lower than the second address boundary, the L2P search engine is further configured to determine that the physical address is classified into the third category of specialized memory addresses mapping to the memory regions of the system area of the non-volatile memory device. Or, responsive to the physical address being equal to or greater than the second address boundary and being equal to or smaller than the first address boundary, the L2P search engine is further configured to determine that the physical address is classified into the second category of volatile memory addresses mapping to the memory blocks of the volatile memory device.

In some implementations, to instruct to fetch the piece of data, the L2P search engine is further configured to, responsive to the physical address being classified into the third category of specialized memory addresses or the first category of user data addresses, instruct to read the piece of data from the non-volatile memory device using the physical address. Or, responsive to the physical address being classified into the second category of volatile memory addresses, the L2P search engine is further configured to instruct to fetch the piece of data from the volatile memory device using the physical address.

In still another aspect, a method for operating a memory controller is provided. An L2P mapping table that maps logical addresses to physical addresses, respectively, is maintained. The physical addresses mapped by the L2P mapping table are organized into address categories based on at least one address boundary.

In some implementations, the address boundaries include a first address boundary stored in a first register.

In some implementations, the address categories include a first category of user data addresses mapping to memory regions of a user area of a non-volatile memory device and a second category of volatile memory addresses mapping to memory blocks of a volatile memory device.

In some implementations, the L2P mapping table maps a first set of logical addresses in the logical addresses to a first set of physical addresses associated with the memory regions of the user area of the non-volatile memory device, respectively, and the first category of user data addresses includes the first set of physical addresses associated with the memory regions of the user area of the non-volatile memory device. The L2P mapping table also maps a second set of logical addresses in the logical addresses to IDs of the memory blocks of the volatile memory device, respectively, and the second category of volatile memory addresses includes the IDs of the memory blocks of the volatile memory device.

In some implementations, each user data address in the first category is greater than the first address boundary; and each volatile memory address in the second category is smaller than the first address boundary.

In some implementations, the at least one address boundary further includes a second address boundary lower than the first address boundary.

In some implementations, the address categories further include a third category of specialized memory addresses mapping to memory regions of a system area of the non-volatile memory device. The L2P mapping table also maps a third set of logical addresses in the logical addresses to a third set of physical addresses associated with the memory regions of the system area of the non-volatile memory device, respectively, and the third category of specialized memory addresses includes the third set of physical addresses associated with the memory regions of the system area of the non-volatile memory device.

In some implementations, each volatile memory address in the second category is greater than or equal to the second address boundary and smaller than or equal to the first address boundary; and each specialized memory address in the third category is smaller than the second address boundary.

In some implementations, the volatile memory device includes DRAM, and the non-volatile memory device includes NAND Flash memory.

In some implementations, responsive to a read request indicative of retrieving a piece of data associated with a logical address, an address of an entry in the L2P mapping table based on the logical address is determined. A physical address stored in the entry of the L2P mapping table is identified based on the address of the entry. An address category which the physical address is classified into is determined based on the first address boundary and the second address boundary. To fetch the piece of data from one of the volatile memory device and the non-volatile memory device is instructed based on the address category.

In some implementations, determining the address category includes, responsive to the physical address being greater than the first address boundary, determining that the physical address is classified into the first category of user data addresses mapping to the memory regions of the user area of the non-volatile memory device. Responsive to the physical address being lower than the second address boundary, determining the address category includes determining that the physical address is classified into the third category of specialized memory addresses mapping to the memory regions of the system area of the non-volatile memory device. Or, responsive to the physical address being equal to or greater than the second address boundary and being equal to or smaller than the first address boundary, determining the address category includes determining that the physical address is classified into the second category of volatile memory addresses mapping to the memory blocks of the volatile memory device.

In some implementations, instructing to fetch the piece of data includes: responsive to the physical address being classified into the third category of specialized memory addresses or the first category of user data addresses, instructing to read the piece of data from the non-volatile memory device using the physical address; or responsive to the physical address being classified into the second category of volatile memory addresses, instructing to fetch the piece of data from the volatile memory device using the physical address.

In yet another aspect, a non-transitory computer-readable storage medium storing instructions is disclosed. The instructions, when executed by a memory controller of a memory system, cause the memory controller to perform a method. The method includes maintaining an L2P mapping table which maps logical addresses to physical addresses, respectively. The method also includes organizing the physical addresses mapped by the L2P mapping table into address categories based on at least one address boundary.

BRIEF DESCRIPTION OF THE DRAWINGS

The accompanying drawings, which are incorporated herein and form a part of the specification, illustrate aspects of the present disclosure and, together with the description, further serve to explain the principles of the present disclosure and to enable a person skilled in the pertinent art to make and use the present disclosure.

Figure 1:
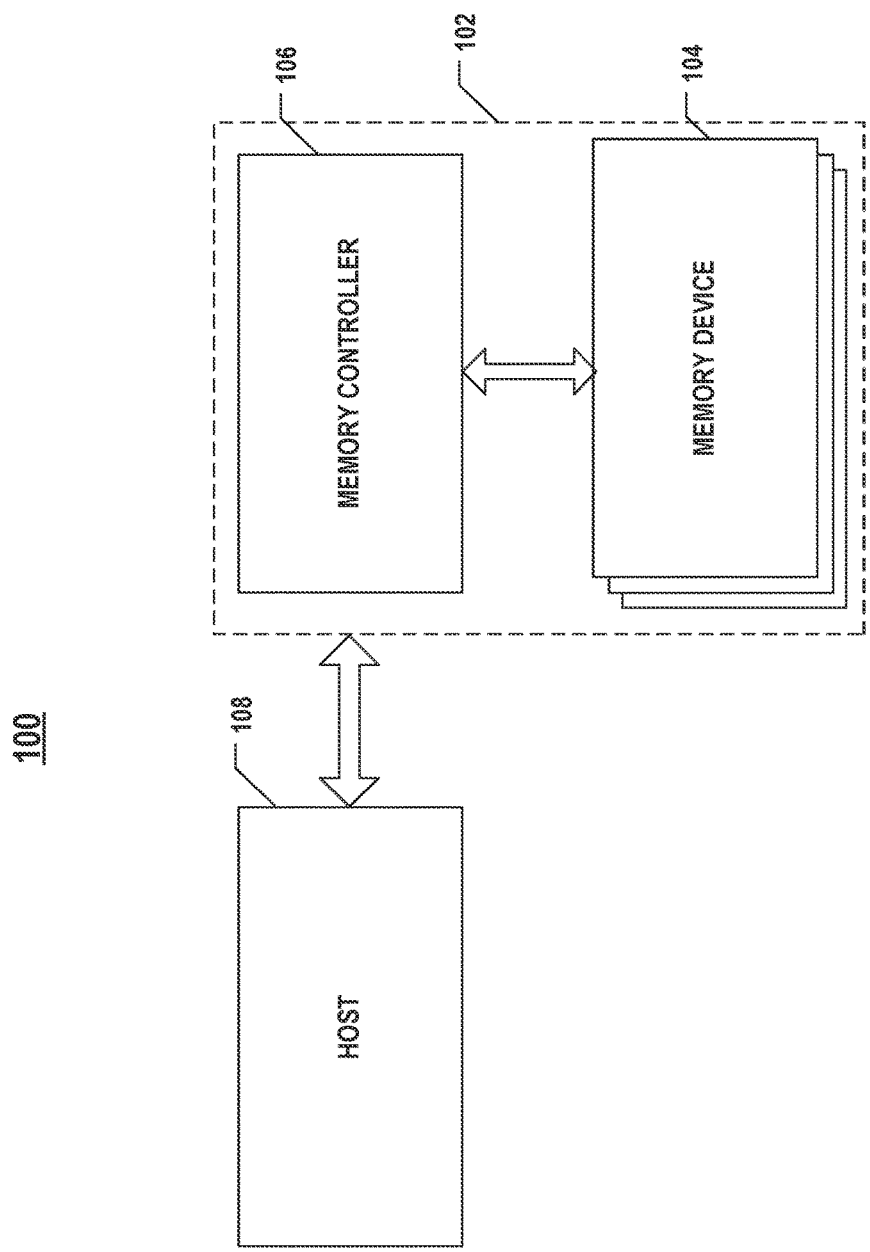
FIG. 1 illustrates a block diagram of a system including a memory system, according to some aspects of the present disclosure.

The present disclosure will be described with reference to the accompanying drawings.

DETAILED DESCRIPTION

In general, terminology may be understood at least in part from usage in context. For example, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

In an SSD scenario (e.g., enterprise SSD), a mapping relationship between logical addresses and physical addresses is recorded by an L2P mapping table which can be stored on a DRAM of the SSD for data tracking purposes. The logical addresses (such as logical block addresses (LBAs)) can be used as indices of the various entries of the L2P mapping table. The content of each entry of the L2P mapping table can be a physical address (such as a physical page address (PPA)) corresponding to the logical address of the entry. In some examples, the size of the L2P mapping table is equal to 1/1024 of the drive capacity of the SSD, which is large and may occupy a significant amount of storage space of the DRAM. The ratio between the size of the L2P mapping table and the drive capacity of the SSD is 1/1024 because the L2P mapping table may use an address data width of 4 bytes to express 4 KiB user data on the SSD. For an SSD with a small capacity, the address data width of 4 bytes can be sufficient to express physical addresses of corresponding physical space of the SSD. However, for an SSD (e.g., enterprise SSD) with a large capacity (e.g., 2 TB, 4 TB, etc.), the address data width of 4 bytes may be insufficient to express the physical addresses of corresponding physical space of the SSD, especially when part of the 4 bytes (e.g., one of the 32 bits) is reserved for marking the types of the physical addresses.

To address one or more of the aforementioned issues, the present disclosure introduces an address management scheme for an L2P mapping table, which does not need to reserve any bits for marking the type or purpose of a physical address. For example, the L2P mapping table may map a plurality of logical addresses to a plurality of physical addresses. The address management scheme disclosed herein can organize the plurality of physical addresses mapped by the L2P mapping table into a plurality of address categories based on at least one address boundary (e.g., a first address boundary and a second address boundary). The plurality of address categories may include at least one of (1) a first category of user data addresses mapping to memory regions of a user area of a non-volatile memory device, (2) a second category of volatile memory addresses (e.g., IDs of memory blocks of a cache or DRAM), or (3) a third category of specialized memory addresses mapping to memory regions of a system area of a non-volatile memory device. No bits are needed to be reserved for distinguishing the different categories of the physical addresses because the first address boundary and the second address boundary can be used to determine the categories of the physical addresses. As a result, all bits in the address data width (such as 32 bits) can be used to express a larger physical space. The size of the L2P mapping table can be reduced, and thus, the size of the DRAM in the enterprise SSD can also be reduced, leading to a reduction in the cost of the DRAM.

FIG. 1 illustrates a block diagram of a system 100 including a memory system 102, according to some aspects of the present disclosure. System 100 can be a mobile phone, a desktop computer, a laptop computer, a tablet, a vehicle computer, a gaming console, a printer, a positioning device, a wearable electronic device, a smart sensor, a virtual reality (VR) device, an argument reality (AR) device, or any other suitable electronic devices having storage therein. As shown in FIG. 1, system 100 can include a host 108 and memory system 102 having one or more memory devices 104 and a memory controller 106. Host 108 can be a processor of an electronic device, such as a central processing unit (CPU), or a system-on-chip (SoC), such as an application processor (AP). Host 108 can be configured to send or receive data (a.k.a. user data or host data) to or from memory system 102. Memory system 102 can be a storage product integrating memory controller 106 and one or more memory devices 104, such as an SSD.

Memory devices 104 can be any memory devices disclosed in the present disclosure, including non-volatile memory devices, such as NAND Flash memory devices. In some implementations, memory device 104 also includes one or more volatile memory devices, such as DRAM devices or static random-access memory (SRAM) devices.

Memory controller 106 is operatively coupled to memory devices 104 and host 108 and is configured to control memory devices 104, according to some implementations. Memory controller 106 can manage the data stored in memory devices 104 and communicate with host 108. In some implementations, memory controller 106 is designed for operating in a low duty-cycle environment like secure digital (SD) cards, compact Flash (CF) cards, universal serial bus (USB) Flash drives, or other media for use in electronic devices, such as personal computers, digital cameras, mobile phones, etc. In some implementations, memory controller 106 is designed for operating in a high duty-cycle environment with SSDs or embedded multimedia card (eMMCs) used as data storage for mobile devices, such as smartphones, tablets, laptop computers, etc., and enterprise storage arrays. Memory controller 106 can be configured to control operations of memory devices 104, such as read, program/write, and/or erase operations. Memory controller 106 can also be configured to manage various functions with respect to the data stored or to be stored in memory devices 104 including, but not limited to bad-block management, garbage collection, L2P address conversion, wear-leveling, etc. In some implementations, memory controller 106 is further configured to process error correction codes (ECCs) with respect to the data read from or written to memory devices 104. Any other suitable functions may be performed by memory controller 106 as well, for example, formatting memory devices 104. Memory controller 106 can communicate with an external device (e.g., host 108) according to a particular communication protocol. For example, memory controller 106 may communicate with the external device through at least one of various interface protocols, such as a non-volatile memory express (NVMe) protocol, an NVMe-over-fabrics (NVMe-oF) protocol, a PCI-express (PCI-E) protocol, a universal serial bus (USB) protocol, a multimedia card (MMC) protocol, a peripheral component interconnection (PCI) protocol, an advanced technology attachment (ATA) protocol, a serial-ATA protocol, a parallel-ATA protocol, a small computer small interface (SCSI) protocol, an enhanced small disk interface (ESDI) protocol, an integrated drive electronics (IDE) protocol, a Firewire protocol, etc.

Figure 2A:
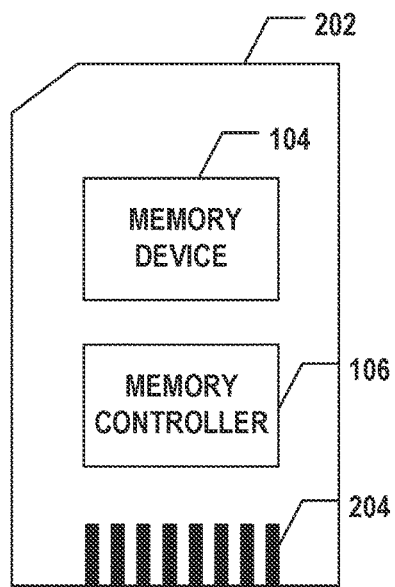
FIG. 2A illustrates a diagram of a memory card having a memory device, according to some aspects of the present disclosure.
Figure 2B:
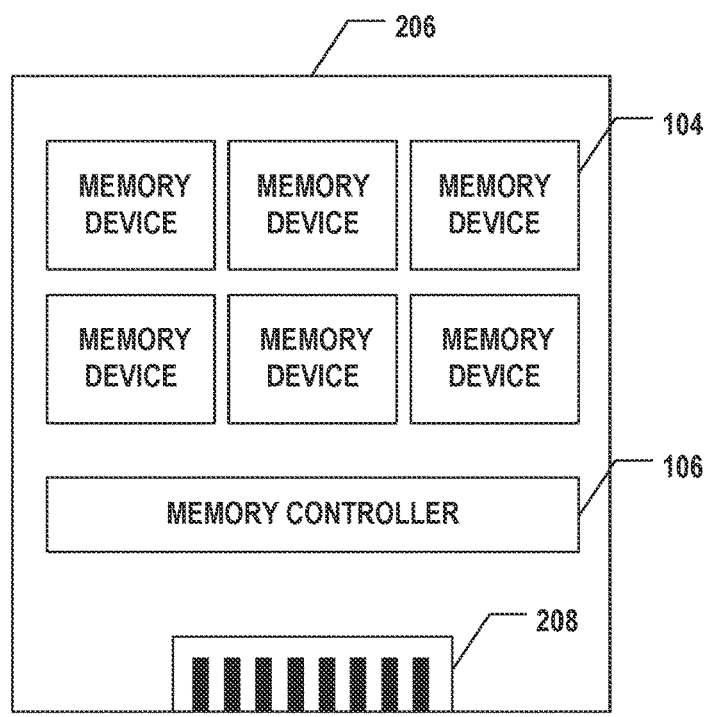
FIG. 2B illustrates a diagram of an SSD having memory devices, according to some aspects of the present disclosure.

Memory controller 106 and one or more memory devices 104 can be integrated into various types of storage devices, for example, being included in the same package, such as a universal Flash storage (UFS) package or an eMMC package. That is, memory system 102 can be implemented and packaged into different types of end electronic products. In one example as shown in FIG. 2A, memory controller 106 and a single memory device 104 may be integrated into a memory card 202. Memory card 202 can include a PC card (PCMCIA, personal computer memory card international association), a CF card, a smart media (SM) card, a memory stick, a multimedia card (MMC, RS-MMC, MMCmicro), an SD card (SD, miniSD, microSD, SDHC), a UFS, etc. Memory card 202 can further include a memory card connector 204 coupling memory card 202 with a host (e.g., host 108 in FIG. 1). In another example as shown in FIG. 2B, memory controller 106 and multiple memory devices 104 may be integrated into an SSD 206. SSD 206 can further include an SSD connector 208 coupling SSD 206 with a host (e.g., host 108 in FIG. 1). In some implementations, the storage capacity and/or the operation speed of SSD 206 is greater than those of memory card 202. In some implementations, memory system 102 is implemented as an SSD 206 that includes both non-volatile memory devices and volatile memory devices as memory devices 104, such as an enterprise SSD.

Figure 3:
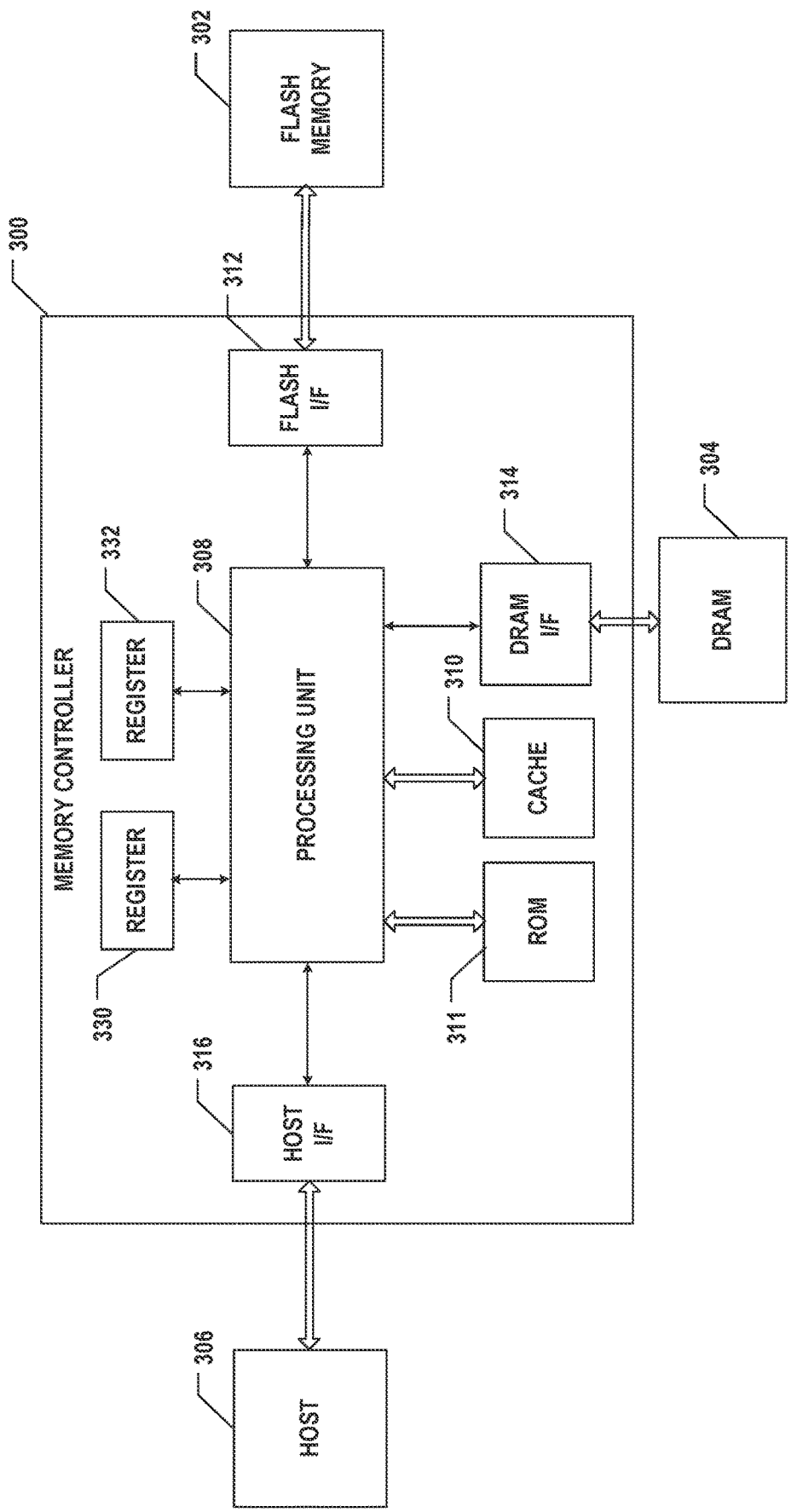
FIG. 3 illustrates a block diagram of a memory controller, according to some aspects of the present disclosure.

FIG. 3 illustrates a block diagram of a memory controller 300, according to some aspects of the present disclosure. Memory controller 300 may be one example of memory controller 106 in FIG. 1. As shown in FIG. 3, memory controller 300 can include a processing unit 308, a cache 310, and a read-only memory (ROM) 311. In some implementations, processing unit 308 is implemented by microprocessors (e.g., digital signal processors (DSPs)) or microcontrollers (a.k.a. microcontroller units (MCUs)) that execute firmware and/or software modules to perform the various functions described herein. The various firmware modules in memory controller 300 described herein can be implemented as firmware codes or instructions stored in ROM 311 and executed by processing unit 308. In some implementations, processing unit 308 includes one or more hardware circuits, for example, fixed logic units such as a logic gate, a multiplexer, a flip-flop, a state machine, field-programmable gate arrays (FPGAs), programmable logic devices (PLDs). For example, the hardware circuits may include dedicated circuits performing a given logic function that is known at the time of device manufacture, such as application-specific integrated circuits (ASICs).

As shown in FIG. 3, memory controller 300 can also include various input/output (I/O) interfaces (I/F), such as a flash interface 312, a DRAM interface 314, and a host interface 316 operatively coupled to flash memory 302 (e.g., an example of non-volatile memory devices), DRAM 304 (e.g., an example of volatile memory devices), and a host 306 (e.g., an example of host 108), respectively. flash interface 312, DRAM interface 314, and host interface 316 can be configured to transfer data, command, clock, or any suitable signals between processing unit 308 and flash memory 302, DRAM 304, and host 306, respectively. flash interface 312, DRAM interface 314, and host interface 316 can implement any suitable communication protocols facilitating data transfer, communication, and management, such as the NVMe protocol and PCI-E protocol, double data rate (DDR) protocol, to name a few.

As described above, both cache 310 and DRAM 304 may be considered as volatile memory devices that can be controlled and accessed by memory controller 300 in a memory system. Consistent with the scope of the present disclosure, a cache can be implemented as part of volatile memory devices, for example, by cache 310 and/or DRAM 304. It is understood that although FIG. 3 shows that cache 310 is within memory controller 300 and DRAM 304 is outside of memory controller 300, in some examples, both cache 310 and DRAM 304 may be within memory controller 300 or outside of memory controller 300.

Consistent with the scope of the present disclosure and disclosed below in detail, memory controller 300 can be configured to maintain an L2P mapping table that maps a plurality of logical addresses to a plurality of physical addresses, respectively. Memory controller 300 can also be configured to organize the plurality of physical addresses mapped by the L2P mapping table into a plurality of address categories based on at least one address boundary. In some implementations, memory controller 300 may further include at least one register configured to store the at least one address boundary. For example, the at least one address boundary may include a first address boundary and a second address boundary, and the at least one register may include registers 330 and 332 configured to store the first address boundary and the second address boundary, respectively. In some other implementations, there may be no registers in memory controller 300, and memory controller 300 may receive the address boundaries from host 306 via host interface 316. In some other implementations, the at least one address boundary may be stored in firmware of memory controller 300, so that memory controller 300 does not need to retrieve the at least one address boundary from any hardware devices. Memory controller 300 is described below in more detail with reference to FIGS. 6-13B.

Figure 4:
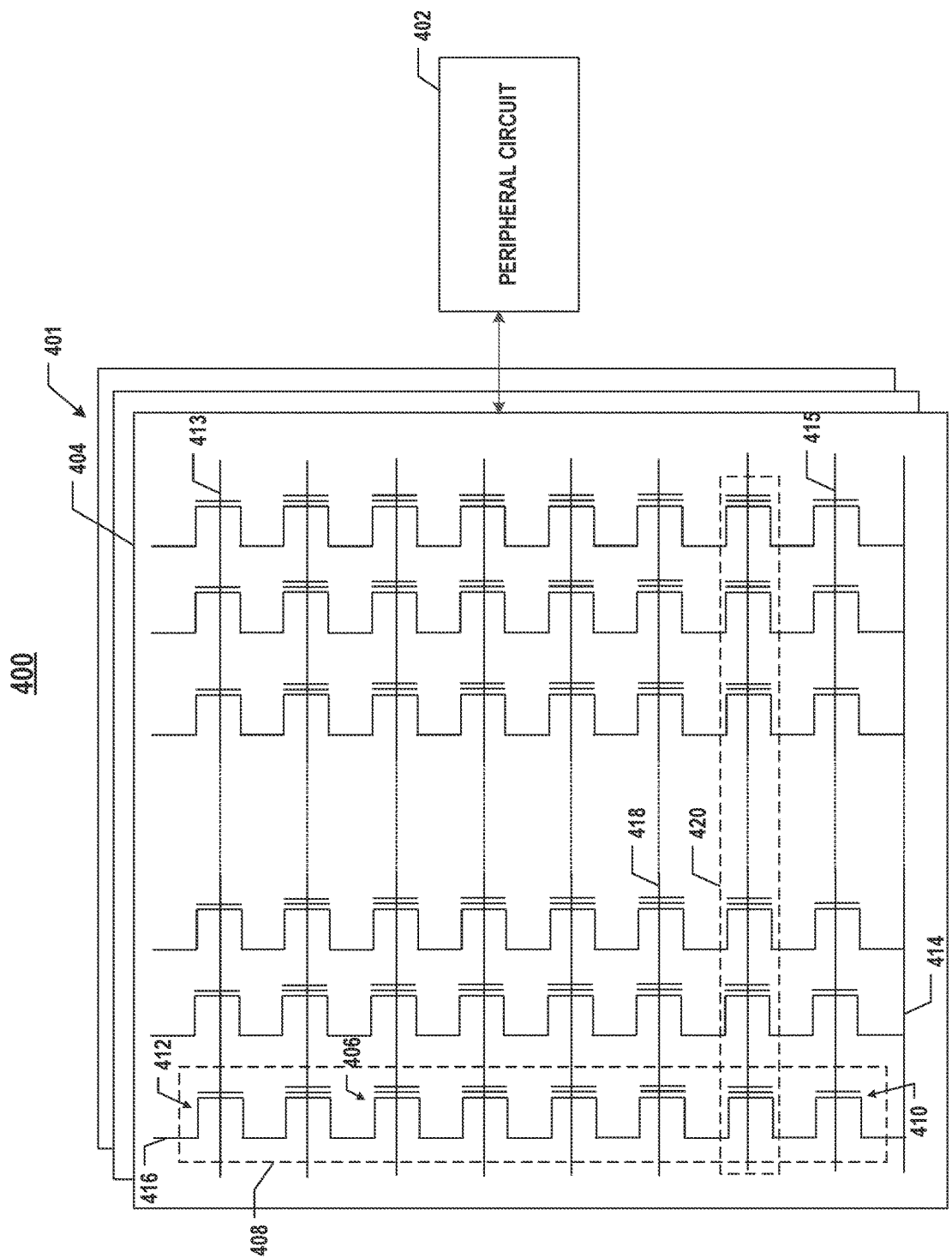
FIG. 4 illustrates a schematic diagram of a NAND Flash memory device including peripheral circuits, according to some aspects of the present disclosure.

FIG. 4 illustrates a schematic circuit diagram of a NAND Flash memory device 400 including peripheral circuits 402, according to some aspects of the present disclosure. NAND Flash memory device 400 may be one example of flash memory 302 in FIG. 3. NAND Flash memory device 400 can include a memory cell array 401 and peripheral circuits 402 operatively coupled to memory cell array 401. Memory cells 406 in memory cell array 401 are provided in the form of an array of memory strings 408 each extending vertically above a substrate (not shown). In some implementations, each memory string 408 includes a plurality of memory cells 406 operatively coupled in series and stacked vertically. Each memory cell 406 can hold a continuous, analog value, such as an electrical voltage or charge, which depends on the number of electrons trapped within a region of memory cell 406. Each memory cell 406 can be either a floating gate type of memory cell including a floating-gate transistor or a charge trap type of memory cell including a charge-trap transistor.

In some implementations, each memory cell 406 is a single-level cell (SLC) that has two possible levels (memory states) and thus, can store one bit of data. For example, the first state "0" can correspond to a first range of threshold voltages, and the second state "1" can correspond to a second range of threshold voltages. In some implementations, each memory cell 406 is an xLC that is capable of storing more than a single bit of data in more than four levels. For example, the xLC may store two bits per cell (a.k.a., multi-level cell (MLC)), three bits per cell (a.k.a., triple-level cell (TLC)), or four bits per cell (a.k.a. quad-level cell (QLC)). Each xLC can be programmed to assume a range of possible nominal storage values (i.e., corresponding to $2^N$ pieces of N-bits data). In some implementations, each memory cell 406 is set to one of $2^N$ levels corresponding to a piece of N-bits data, where N is an integer greater than 1. N may denote the total number of bits per cell. For example, N=2 for MLC, N=3 for TLC, or N=4 for QLC.

As shown in FIG. 4, each memory string 408 can also include a source select gate (SSG) transistor 410 at its source end and a drain select gate (DSG) transistor 412 at its drain end. SSG transistor 410 and DSG transistor 412 can be configured to activate select memory strings 408 (columns of the array) during read and program operations. In some implementations, the sources of memory strings 408 in the same block 404 are coupled through a same source line (SL) 414, e.g., a common SL. In other words, all memory strings 408 in the same block 404 have an array common source (ACS), according to some implementations. The drain of each memory string 408 is coupled to a respective bit line 416 from which data can be read or written via an output bus (not shown), according to some implementations. In some implementations, each memory string 408 is configured to be selected or deselected by applying a select voltage or a deselect voltage to the gate of respective DSG transistor 412 through one or more DSG lines 413 and/or by applying a select voltage or a deselect voltage to the gate of respective SSG transistor 410 through one or more SSG lines 415.

As shown in FIG. 4, memory strings 408 can be organized into multiple blocks 404, each of which can have a common source line 414, e.g., coupled to the ACS. In some implementations, each block 404 is the basic data unit for erase operations, i.e., all memory cells 406 on the same block 404 are erased at the same time. To erase memory cells 406 in a select block 404, source lines 414 coupled to select block 404 as well as unselect blocks 404 in the same plane as select block 404 can be biased with an erase voltage (Vers), such as a high positive bias voltage (e.g., 20 V or more).

Memory cells 406 of adjacent memory strings 408 can be coupled through word lines 418 that select which row of memory cells 406 is affected by read and program operations. In some implementations, each word line 418 is coupled to a physical page 420 of memory cells 406, which is the basic data unit for read and write (program) operations. The size of one physical page 420 in bits can relate to the number of memory strings 408 coupled by word line 418 in one block 404. Each word line 418 can include a plurality of control gates (gate electrodes) at each memory cell 406 in respective physical page 420 and a gate line coupling the control gates.

Peripheral circuits 402 can be operatively coupled to memory cell array 401 through bit lines 416, word lines 418, source lines 414, SSG lines 415, and DSG lines 413. Peripheral circuits 402 can include any suitable analog, digital, and mixed-signal circuits for facilitating the operations of memory cell array 401 by applying and sensing voltage signals and/or current signals to and from each select memory cell 406 through bit lines 416, word lines 418, source lines 414, SSG lines 415, and DSG lines 413. Peripheral circuits 402 can include various types of peripheral circuits formed using complementary metal-oxide-semiconductor (CMOS) technologies.

Figure 5:
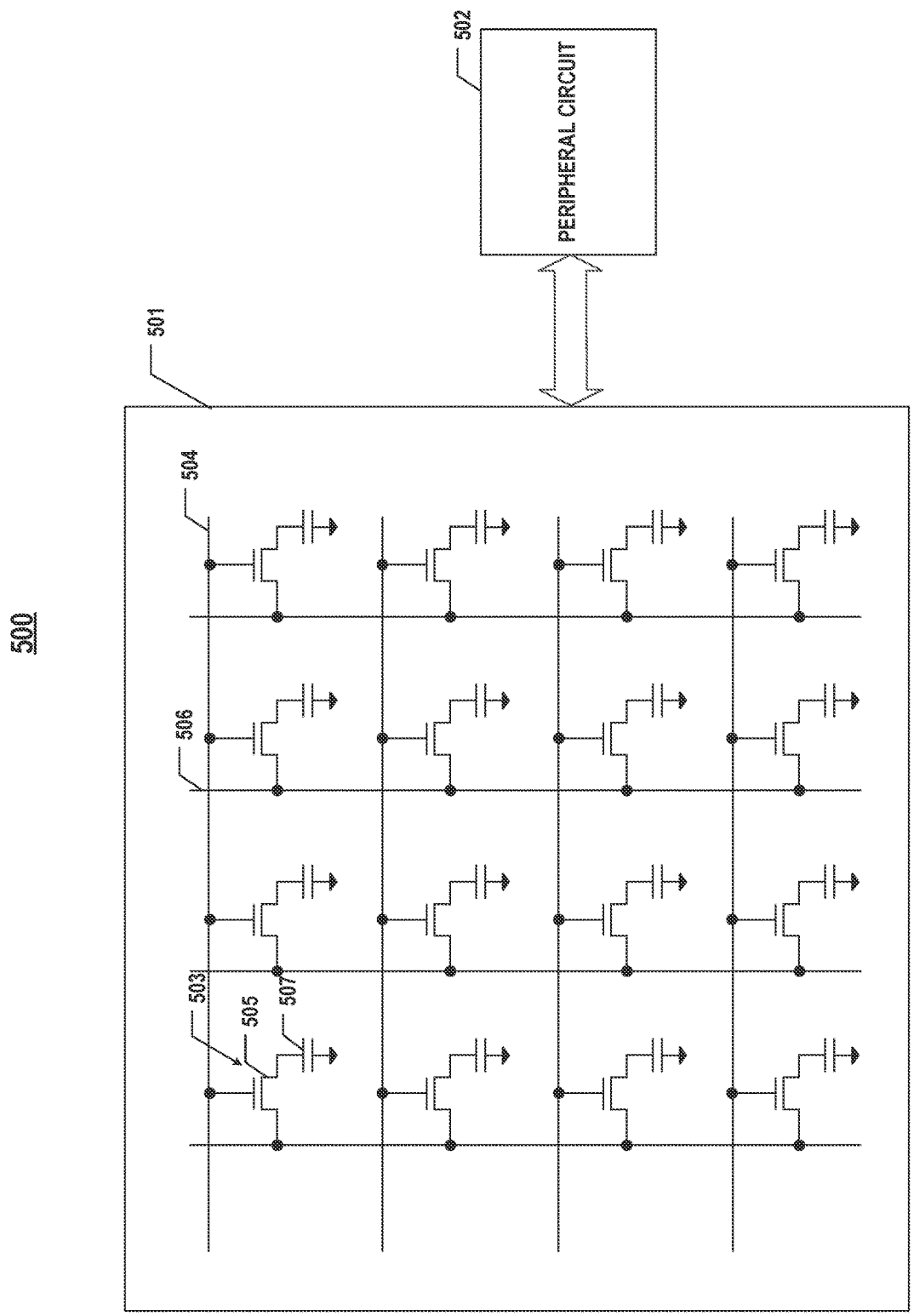
FIG. 5 illustrates a schematic diagram of a DRAM device including peripheral circuits, according to some aspects of the present disclosure.

FIG. 5 illustrates a schematic circuit diagram of a DRAM device 500 including peripheral circuits 502, according to some aspects of the present disclosure. DRAM device 500 may be one example of DRAM 304 in FIG. 3. DRAM device 500 can include a memory cell array 501 and peripheral circuits 502 operatively coupled to memory cell array 501. Memory cells 503 can be arranged in memory cell array 501 having rows and columns. DRAM device 500 requires periodic refreshing of memory cells 503. In some implementations, each memory cell 503 includes a capacitor 507 for storing a bit of data as a positive or negative electrical charge as well as a transistor 505 that controls access to capacitor 507. That is, each memory cell 503 shown in FIG. 5 is a one-transistor, one-capacitor (1T1C) cell, according to some implementations.

DRAM device 500 can include word lines 504 coupling peripheral circuits 502 and memory cell array 501 for controlling the switch of transistors 505 in memory cells 503 located in a row, as well as bit lines 506 coupling peripheral circuits 502 and memory cell array 501 for sending data to and/or receiving data from memory cells 503 located in a column. That is, each word line 504 is coupled to a respective row of memory cells 503, and each bit line 506 is coupled to a respective column of memory cells 503. The gate of transistor 505 can be coupled to word line 504, one of the source and the drain of transistor 505 can be coupled to bit line 506, the other one of the source and the drain of transistor 505 can be coupled to one electrode of capacitor 507, and the other electrode of capacitor 507 can be coupled to the ground.

Peripheral circuits 502 can be coupled to memory cell array 501 through bit lines 506, word lines 504, and any other suitable metal wirings. Peripheral circuits 502 can include any suitable circuits for facilitating the operations of memory cell array 501 by applying and sensing voltage signals and/or current signals through word lines 504 and bit lines 506 to and from each memory cell 503. Peripheral circuits 502 can include various types of peripheral circuits formed using CMOS technologies.

Figure 6:
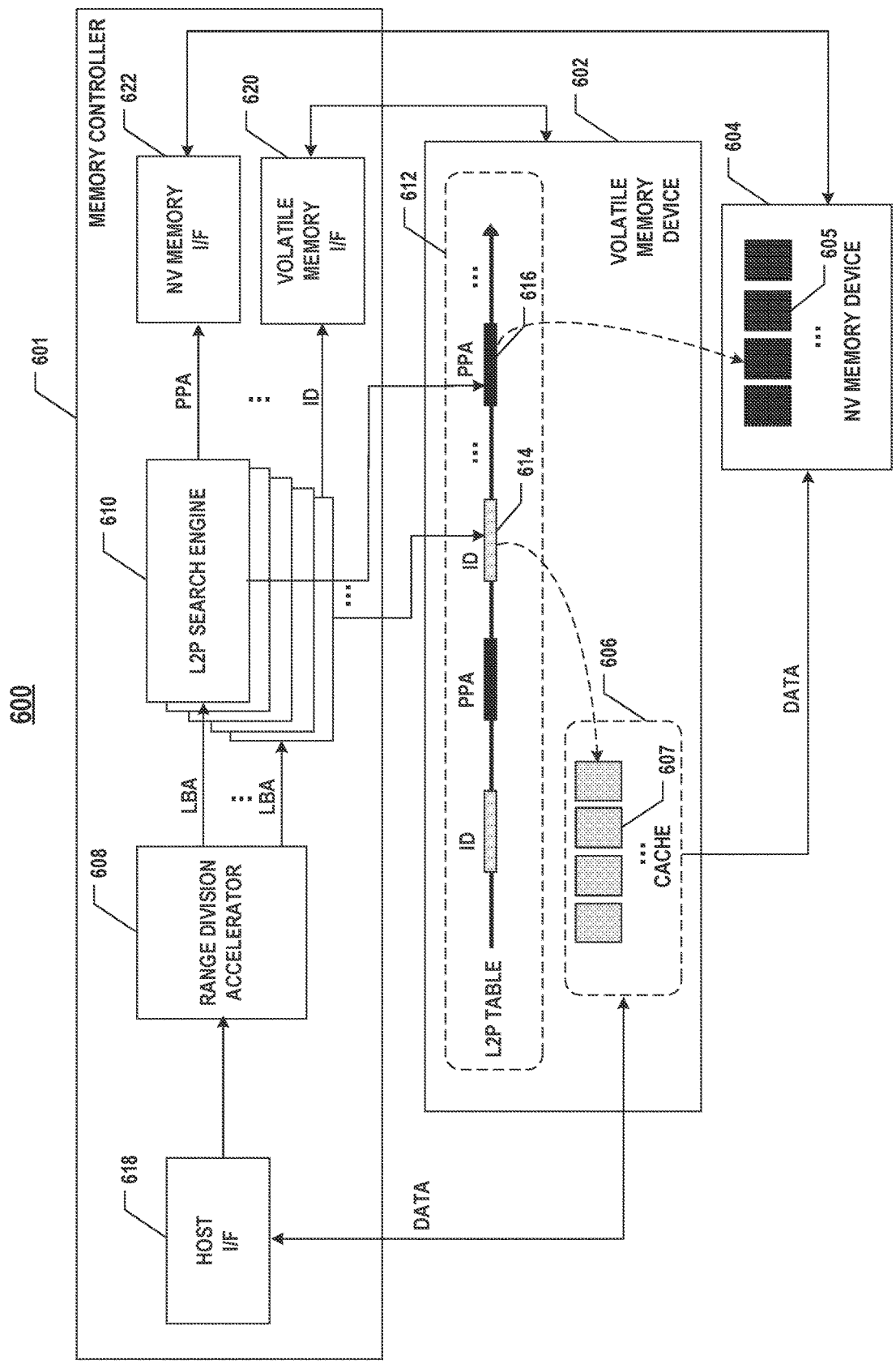
FIG. 6 illustrates a detailed schematic diagram of a memory system managing an L2P mapping table and performing data search based on the L2P mapping table, according to some aspects of the present disclosure.

FIG. 6 illustrates a detailed schematic diagram of a memory system 600 managing an L2P mapping table and performing data search based on the L2P mapping table, according to some aspects of the present disclosure. Memory system 600 may be one example of memory system 102 in FIG. 1. As shown in FIG. 6, memory system 600 can include a memory controller 601, a volatile memory device 602, and a non-volatile memory device 604. Memory controller 601 may be one example of memory controller 106 in FIG. 1. Volatile memory device 602 and non-volatile memory device 604 may be examples of memory devices 104 in FIG. 1. In some implementations, volatile memory device 602 includes DRAM (e.g., DRAM device 500 in FIG. 5), and non-volatile memory device 604 includes NAND Flash memory (e.g., NAND Flash memory device 400 in FIG. 4). In some implementations, memory controller 601 is further configured to cache a piece of host/user data in volatile memory device 602 or flush the piece of host/user data from volatile memory device 602 to non-volatile memory device 604.

To enable data search and access, non-volatile memory device 604 can be divided into multiple memory regions 605 each has a unique physical address. In some implementations, each memory region 605 includes one or more logical pages, for example, a portion (e.g., ½, ¼. or ⅛) of one physical page 420 of NAND Flash memory device 400. For example, the size of each memory region 605 may be 4,096 bytes. It is understood that memory region 605 may correspond to any suitable memory cell groups in non-volatile memory device 604 besides pages, such as portions of a page, blocks (e.g., blocks 404 of NAND Flash memory device 400), etc. For example, the physical address of memory region 605 can be referred to as a physical allocation address (PAA), and a logical address corresponding to the PAA can be referred to as a logical allocation address (LAA). In another example, the physical address of memory region 605 can be a physical page address (PPA) when memory region 605 corresponds to a page of non-volatile memory device 604, and a logical address corresponding to the PPA can be a logical block address (LBA).

Consistent with the scope of the present disclosure, to enable data search and access, cache 606 of volatile memory device 602 can be divided into multiple memory blocks 607 each having a unique identifier (ID, a.k.a., memory block ID). In some implementations, each memory block 607 includes one or more pages, for example, rows or columns of memory cells 503 of DRAM device 500. In some implementations, to enable uniform data search between non-volatile memory device 604 and volatile memory device 602, the size of each memory region 605 and the size of each memory block 607 may be the same. It is understood that in some examples, the size of each memory region 605 and the size of each memory block 607 may be different. For example, the size of each memory block 607 may be 4,096 bytes as well. It is understood that memory block 607 may correspond to any suitable memory cell groups in volatile memory device 602 besides pages, such as portions of a page, codewords, etc.

Cache 606 can be a portion of volatile memory device 602 that temporarily stores (caches) the frequently used and/or recently accessed data to speed up the read and write operations of non-volatile memory device 604. Any suitable caching algorithms can be used to determine which data should be stored in cache 606 and when it should be replaced, including, for example, least recently used (LRU), most recently used (MRU), and first-in, first-out (FIFO). In some implementations, data from the host (host/user data) is first cached in cache 606 of volatile memory device 602, and flushed to non-volatile memory device 604 under certain conditions based on the caching algorithm. For example, when the size of the data in cache 606 reaches a preset threshold (maximum caching size), data in cache 606 may be flushed to non-volatile memory device 604. Cache 606 can be implemented by any suitable type of volatile memory device 602, for example, DRAM 304 and/or cache 310 in FIG. 3.

Consistent with the scope of the present disclosure, to enable uniform search and access of the data, a uniform, expanded L2P mapping table 612 can be maintained and stored in volatile memory device 602 to map the logical addresses of data, not only to the physical addresses 616 (e.g., PPAs) of memory regions 605 in non-volatile memory device 604, respectively, but also to the IDs 614 of memory blocks 607 in cache 606 of volatile memory device 602, respectively. The logical addresses can identify the host/user data and be known to memory controller 601. In some implementations, a logical address indicates the basic logical unit of data for each read or write operation, such as a logical block address (LBA). In some implementations, to enable uniform data search between non-volatile memory device 604 and volatile memory device 602, the size of each memory region 605, the size of each memory block 607, and the size of the data corresponding to each logical address may be the same. For example, the size of the data corresponding to each logical address may be 4,096 bytes as well. Since memory controller 601 operates based on logical addresses, as opposed to physical addresses (e.g., physical addresses 616 or IDs 614), L2P mapping table 612 can be used to enable the conversion between logical addresses and physical addresses across both non-volatile memory device 604 and volatile memory device 602 in a uniform manner, as described below in detail.

In some implementations, L2P mapping table 612 can be stored in non-volatile memory device 604. In some other implementations, L2P mapping table 612 can be stored in any suitable type of volatile memory device 602, such as DRAM 304 in FIG. 3. For example, the same volatile memory device 602, such as DRAM 304 in FIG. 3, includes both cache 606 and L2P mapping table 612. It is understood that in some examples, cache 606 and L2P mapping table 612 may be included in different volatile memory devices 602. For example, cache 606 may be included in an SRAM, while DRAM 304 may include L2P mapping table 612. Although L2P mapping table 612 is shown in FIG. 6 as being outside of cache 606, it is understood that in some examples, L2P mapping table 612 may be stored in cache 606 as well.

Figure 7:
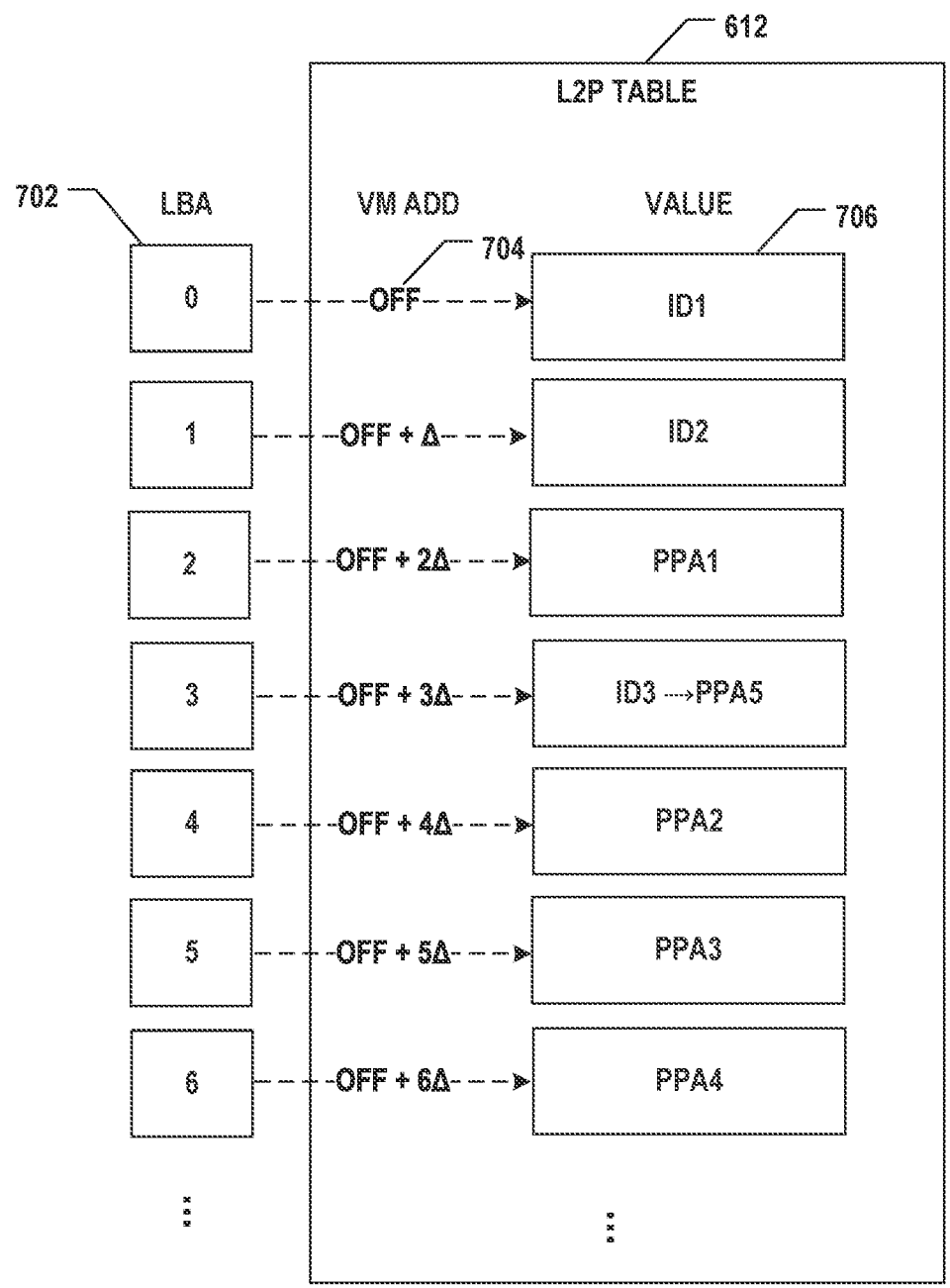
FIG. 7 illustrates an L2P mapping table, according to some aspects of the present disclosure.

In some implementations, L2P mapping table 612 can be stored in volatile memory device 602 with the addresses in volatile memory device 602. For example, as shown in FIG. 7, L2P mapping table 612 may include addresses 704 in volatile memory device 602 (VM Add) each associated with a value 706. Values 706 may include two types of information: IDs 614 of memory blocks 607 in cache 606 (e.g., ID1, ID2, ID3, etc.), and physical addresses 616 (PPAs) of memory regions 605 in non-volatile memory device 604 (e.g., PPA1, PPA2, PPA3, PPA4, etc.). As shown in FIG. 7, L2P mapping table 612 may map logical addresses 702 (LBAs) of host/user data to IDs 614 of memory blocks 607 in cache 606 and physical addresses 616 of memory regions 605 in non-volatile memory device 604 through addresses 704. For example, for each piece of host/user data, a corresponding address 704 for an entry of L2P mapping table 612 in volatile memory device 602 may be determined based on the respective LBA 702 associated with the piece of host/user data. In one example as shown in FIG. 7, a respective LBA 702 (e.g., 0, 1, 2, 3, 4, 5, 6, etc.) associated with an entry can be multiplied by an entry size A and then added with an address offset (OFF) to form a corresponding address 704 of the entry, where the entry size A may represent a length of value 706 stored in the entry (e.g., Δ=4 bytes). The address offset can be determined, for example, based on where L2P mapping table 612 is stored in volatile memory device 602. The corresponding value 706 at the determined address 704 of L2P mapping table 612 may thus be determined, which indicates either an ID 614 of a memory block 607 in cache 606 or a physical address 616 of a memory region in non-volatile memory device 604. As such, LBAs 702 of host/user data may be mapped to a plurality of physical addresses (e.g., IDs 614 of memory blocks 607 in cache 606 and physical addresses 616 of memory regions 605 in non-volatile memory device 604), respectively, by L2P mapping table 612.

Referring back to FIG. 6, memory controller 601 can include multiple I/O interfaces, including a volatile memory interface 620 operatively coupled to volatile memory device 602, a non-volatile memory interface 622 operatively coupled to non-volatile memory device 604, and a host interface 618 operatively coupled to cache 606 of volatile memory device 602 and the host (not shown). Examples of those I/O interfaces may include DRAM interface 314, flash interface 312, and host interface 316 in FIG. 3, which may implement any suitable communication protocols facilitating data transfer, communication, and management, such as the NVMe protocol and PCI-E protocol, DDR protocol, to name a few.

Host interface 618 can be configured to receive write requests and read requests from the host. Each write request can be indicative of a piece of data associated with a logical address (e.g., LBA) to be written to memory system 600. Similarly, each read request can be indicative of a piece of data associated with a logical address (e.g., LBA) to be read from memory system 600. In some implementations, in response to receiving a write request or a read request, host interface 618 is also configured to fetch the piece of data from the host to temporarily store (cache) the piece of data in cache 606, or vice versa. For example, host interface 618 may include a direct memory access (DMA) unit that accesses data from and to cache 606.

Non-volatile memory interface 622 can be configured to enable memory controller 601 to access data stored in non-volatile memory device 604 based on the physical addresses (e.g., PPAs) of memory regions 605. Volatile memory interface 620 can be configured to enable memory controller 601 to access data stored in volatile memory device 602, such as to manage L2P mapping table 612 and to access data in cache 606. In some implementations, volatile memory interface 620 is configured to convert IDs 614 of memory blocks 607 in cache 606 to physical addresses of volatile memory device 602 that can be used directly by memory controller 601 for operating the memory cells of volatile memory device 602. In other words, while IDs 614 of memory blocks 607 in cache 606 can be used to facilitate the data search by L2P mapping table 612, memory controller 601 can still use the physical addresses of volatile memory device 602 to access data in volatile memory device 602. As a result, volatile memory device 602 does not need to be modified to accommodate the usage of IDs 614 of memory blocks 607 for data search, according to some implementations.

As shown in FIG. 6, memory controller 601 can further include a range division accelerator 608 and one or more L2P search engines 610 operatively coupled to volatile memory device 602, non-volatile memory interface 622, and volatile memory interface 620. In some implementations, range division accelerator 608 and L2P search engines 610 are firmware modules implemented by firmware codes/instructions stored in a memory (e.g., ROM 311 in FIG. 3 or flash memory 302 in FIG. 3) and executed by a processing unit (e.g., processing unit 308 in FIG. 3). In some implementations, range division accelerator 608 and L2P search engines 610 are hardware modules implemented by dedicated circuits, such as ASICs, for performing their dedicated functions described herein. The hardware implementation of range division accelerator 608 and L2P search engines 610 can improve search parallelism and reduce firmware overhead, thereby further improving data search performance.

Range division accelerator 608 can be configured to generate data search requests based on the read and write requests from the host via host interface 618, and assign the search requests to L2P search engines 610. That is, range division accelerator 608 can divide the read requests or write requests into search requests to be handled by multiple L2P search engines 610 in parallel, for example, based on the different logical addresses associated with the data of the read requests or write requests. For example, for each search request, range division accelerator 608 may identify an idle L2P search engine 610 to handle the search request. In some implementations, in response to receiving a write request indicative of a piece of data associated with a logical address (e.g., LBA), range division accelerator 608 is configured to assign the piece of the data to one of memory blocks 607 in cache 606 with a unique one of IDs 614, which triggers host interface 618 to fetch the corresponding piece of data from the host to the corresponding memory block 607 in cache 606.

L2P search engines 610 can be configured to handle the search requests and maintain L2P mapping table 612 stored in volatile memory device 602 through volatile memory interface 620 based on the handling of the search requests. In some implementations, a single L2P mapping table 612 is maintained for memory system 600, and multiple L2P search engines 610 are configured to maintain the same L2P mapping table 612 and use the same L2P mapping table 612 for data search. For example, multiple L2P search engines 610 may be configured to search multiple pieces of data, respectively, in parallel based on the same L2P mapping table 612. It is understood that in some examples, a single L2P search engine 610 may be used to handle the search requests. In some implementations, in response to host interface 618 fetching a piece of data from the host to the corresponding memory block 607 in cache 606 in response to the write request, L2P search engine 610 may be configured to update L2P mapping table 612 to map the logical address (e.g., LBA) associated with the piece of data to the unique ID 614 of the corresponding memory block 607. For example, as shown in FIG. 7, assuming LBA 702 of the piece of data is "3," value 706 may be updated by search engine 610 to become "ID3," which is the unique ID 614 of the corresponding memory block 607. Value 706 may be stored at address 704 "OFF+3Δ" of L2P mapping table 612 in volatile memory device 602. In some implementations, in response to the piece of cached data in cache 606 being flushed to one of memory regions 605 in non-volatile memory device 604 with a unique one of physical addresses 616 (e.g., PPA), L2P search engine 610 is further configured to update L2P mapping table 612 to map the logical address (e.g., LBA) associated with the piece of data to the unique physical address 616 of the corresponding memory region 605. For example, as shown in FIG. 7, assuming LBA 702 of the piece of data is "3," value 706 may be updated by L2P search engine 610 to become "PPA5," which is the unique physical address 616 of the corresponding memory region 605, since the piece of data associated with LBA 3 has been moved from ID3 in cache 606 to PPA5 in non-volatile memory device 604.

In some implementations, in response to receiving a search request for a read request indicative of a piece of data with a logical address (e.g., LBA), L2P search engine 610 is configured to search the piece of data based on the logical address and L2P mapping table 612. L2P search engine 610 can be configured to determine an address of L2P mapping table 612 in volatile memory device 602 based on the logical address, and then determine the value at the address of L2P mapping table 612. L2P search engine 610 may identify whether the value is an ID 614 of memory block 607 in cache 606 or a physical address 616 of memory region 605 in non-volatile memory device 604 by performing operations like those described below with reference to FIGS. 11A and 11B.

In one example, as shown in FIG. 7, assuming LBA 702 of the piece of data is "0," L2P search engine 610 may first add LBA 702 "0" multiplied by the entry size A to the address offset "OFF" to obtain address 704 "OFF," and then identify value 706 at address 704 "OFF" to be "ID1," meaning that the piece of data to be read is data currently cached in memory block ID1 in cache 606. In another example, as shown in FIG. 7, assuming LBA 702 of the piece of data is "2," L2P search engine 610 may first add LBA 702 "2" multiplied by the entry size A to the address offset "OFF" to obtain address 704 "OFF+2Δ," and then identify value 706 at address 704 "OFF+2Δ" to be "PPA1," meaning that the piece of data to be read is data currently stored in memory region PPA1 in non-volatile memory device 604.

In some implementations, in response to identifying the ID 614 of memory block 607 in cache 606, L2P search engine 610 provides the identified ID 614 to volatile memory interface 620, and volatile memory interface 620 converts the ID 614 to a corresponding physical address in volatile memory device 602, such that host interface 618 can fetch the piece of data from the corresponding physical address in volatile memory device 602, for example, using DMA. In some implementations, in response to identifying the physical address 616 of memory region 605 in non-volatile memory device 604, L2P search engine 610 provides the identified physical address 616 (e.g., PPA) to non-volatile memory interface 622, such that non-volatile memory interface 622 can fetch the piece of data from the corresponding physical address in non-volatile memory device 604.

Figure 8:
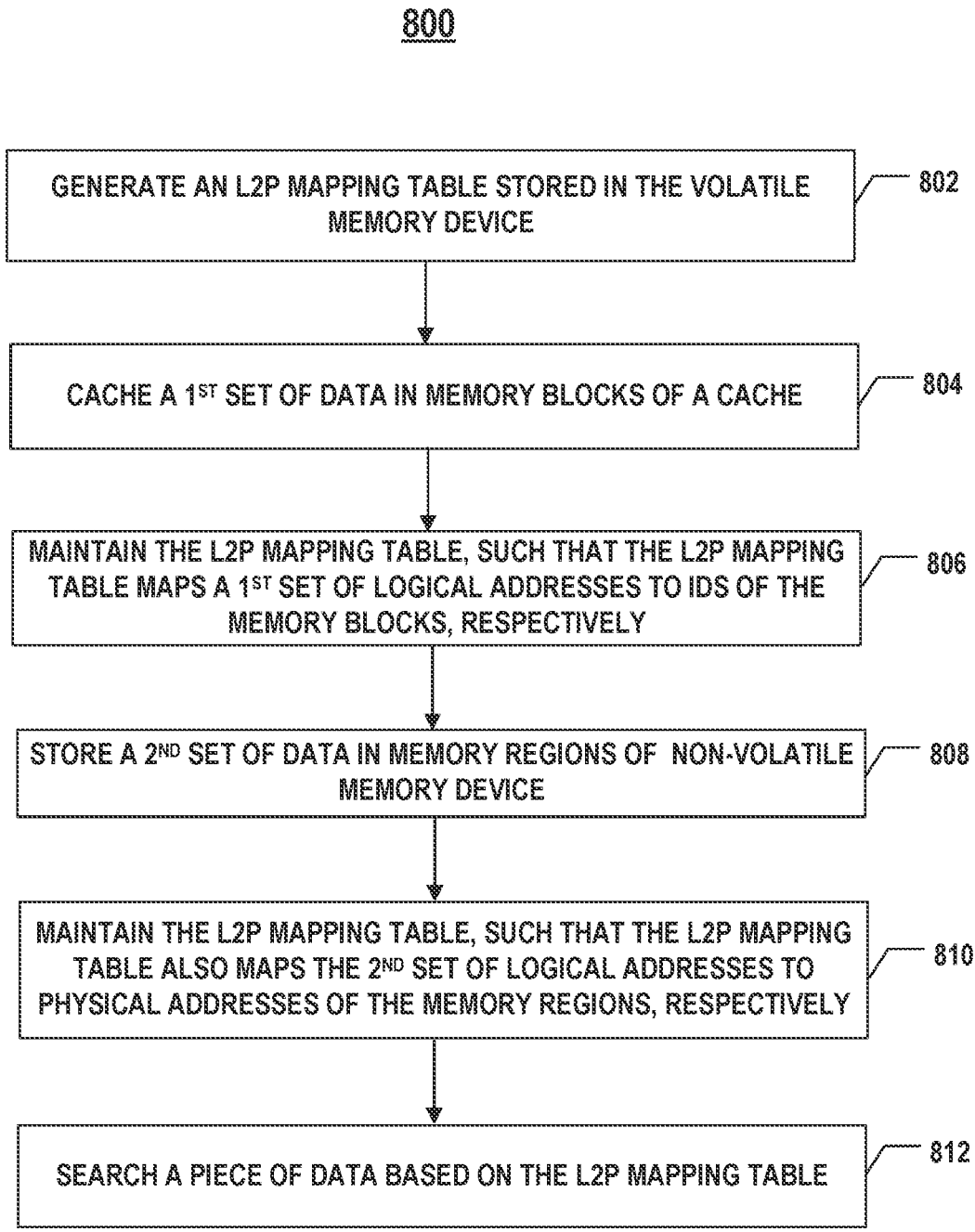
FIG. 8 illustrates a flowchart of a method for operating a memory controller, according to some aspects of the present disclosure.

FIG. 8 illustrates a flowchart of a method 800 for operating a memory controller, according to some aspects of the present disclosure. The memory controller may be any suitable memory controller disclosed herein, such as memory controller 601. It is understood that the operations shown in method 800 may not be exhaustive and that other operations can be performed as well before, after, or between any of the illustrated operations. Further, some of the operations may be performed simultaneously, or in a different order than shown in FIG. 8.

The memory controller is operatively coupled to a volatile memory device and a non-volatile memory device. The volatile memory device can include a cache. The cache is divided into memory blocks each has a respective unique one of IDs. The non-volatile memory device is divided into memory regions each having a respective unique one of physical addresses. For example, as shown in FIG. 6, volatile memory device 602 may include cache 606, which may be divided into memory blocks 607 each having a unique ID 614, and non-volatile memory device 604 may be divided into memory regions 605 each having a unique physical address 616.

Referring to FIG. 8, method 800 starts at operation 802, in which an L2P mapping table is generated and stored in the volatile memory device. For example, as shown in FIG. 6, memory controller 601 may generate L2P mapping table 612 during the initiation of memory system 600 and store L2P mapping table 612 in volatile memory device 602 during the operation of memory system 600. For example, as shown in FIG. 7, L2P mapping table 612 may include values 706 at each address 704 thereof, which may be mapped to LBAs 702, respectively.

Method 800 proceeds to operation 804, as illustrated in FIG. 8, in which a first set of data is cached in the memory blocks of the cache. The first set of data is associated with a first set of logical addresses, respectively. For example, as shown in FIG. 6, memory controller 601 may cache pieces of host/user data in memory blocks 607, respectively, in cache 606. Each piece of host/user data may be associated with a respective one of logical addresses (e.g., LBAs). In one example, host interface 618 of memory controller 601 may fetch host/user data from the host to cache the host/user data in memory blocks 607 using DMA.

Method 800 proceeds to operation 806, as illustrated in FIG. 8, in which the L2P mapping table is maintained, such that the L2P mapping table maps the first set of logical addresses to the IDs of the memory blocks of the cache, respectively. For example, as shown in FIGS. 6 and 7, memory controller 601 may maintain L2P mapping table 612, such that a set of LBAs 702 may be mapped to IDs 614 of memory blocks 607 via addresses 704, respectively.

Method 800 proceeds to operation 808, as illustrated in FIG. 8, in which a second set of data is stored in the memory regions of the non-volatile memory device. The second set of data is associated with a second set of logical addresses, respectively. For example, as shown in FIG. 6, memory controller 601 may store pieces of host/user data in memory regions 605, respectively, in non-volatile memory device 604. Each piece of host/user data may be associated with a respective one of logical addresses (e.g., LBAs). In one example, the pieces of host/user data may be flushed from cache 606 to non-volatile memory device 604.

Method 800 proceeds to operation 810, as illustrated in FIG. 8, in which the L2P mapping table is maintained, such that the L2P mapping table maps the second set of logical addresses to the physical addresses of the memory regions of the non-volatile memory device, respectively. For example, as shown in FIGS. 6 and 7, memory controller 601 may maintain L2P mapping table 612, such that another set of LBAs 702 may be mapped to physical addresses 616 (e.g., PPAs) of memory regions 605 via addresses 704, respectively.

Method 800 proceeds to operation 812, as illustrated in FIG. 8, in which a piece of data is searched based on the L2P mapping table. As shown in FIG. 6, multiple L2P search engines 610 of memory controller 601 may perform data search of multiple pieces of data in parallel based on the logical addresses of the multiple pieces of data and L2P mapping table 612.

In some implementations, to search the piece of data, an address of the L2P mapping table in the volatile memory device is determined based on a logical address associated with the piece of the data, and a value at the address of the L2P mapping table is determined. For example, as shown in FIGS. 6 and 7, each L2P search engine 610 may calculate address 704 of L2P mapping table 612 based on LBA 702 and the address offset, and identify value 706 at address 704 to be either an ID of a memory block of the volatile memory device or a physical address (e.g., PPA) of a memory region of the non-volatile memory device. In some implementations, to search the piece of data, in response to the value being one of the IDs of the memory blocks in the volatile memory device, the piece of the data is fetched from the memory block in the volatile memory device having the ID. In some implementations, to search the piece of data, in response to the value being one of the physical addresses of the memory regions in the non-volatile memory device, the piece of the data is fetched from the memory region in the non-volatile memory device having the physical address.

For example, as shown in FIGS. 6 and 7, if L2P search engine 610 identifies value 706 at address 704 to be an ID 614, host interface 618 may fetch the piece of data from memory block 607 in cache 606 that has the identified ID 614, for example, using DMA. In contrast, if L2P search engine 610 identifies value 706 at address 704 to a physical address 616 (e.g., PPA), non-volatile memory interface 622 may fetch the piece of data from memory region 605 in non-volatile memory device 604 that has the identified physical address 616.

Figure 9:
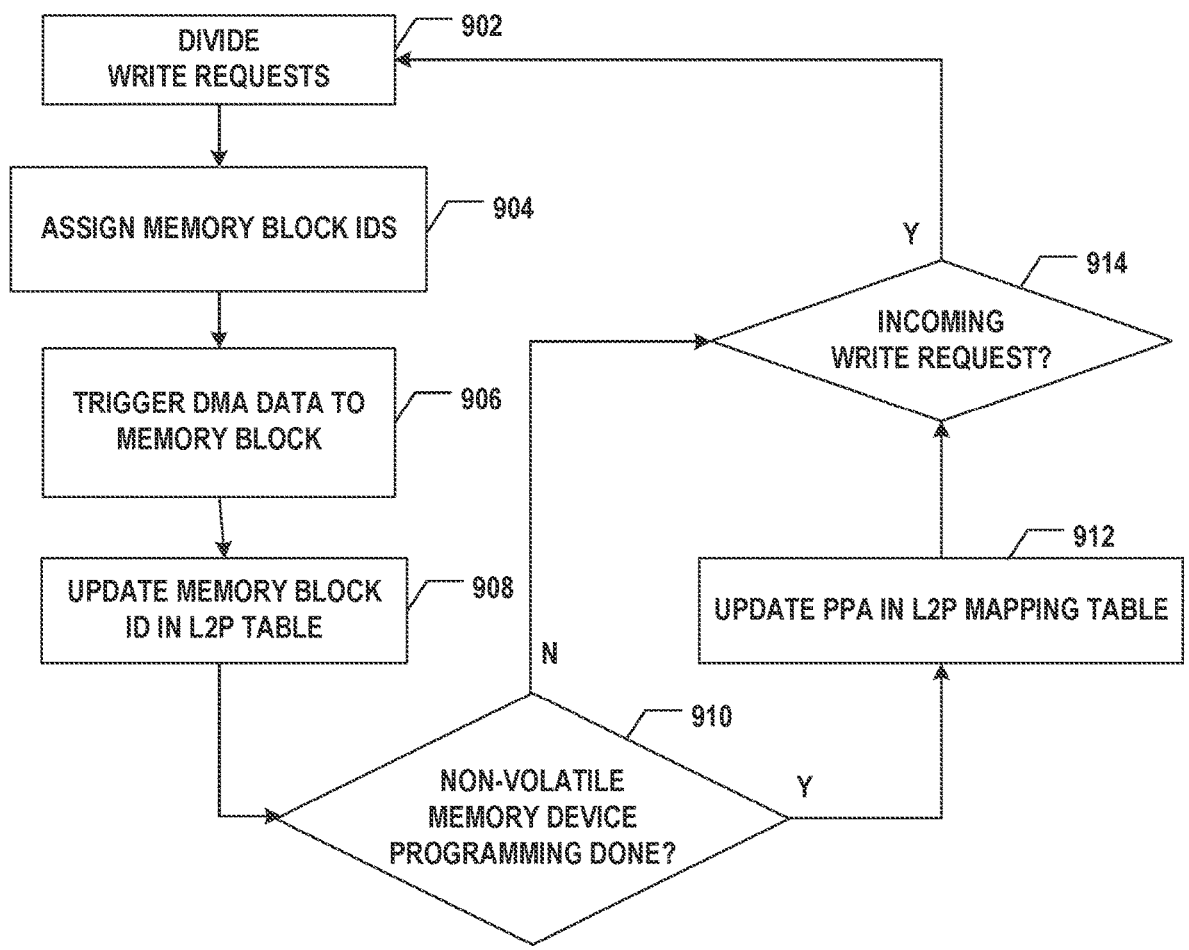
FIG. 9 illustrates a flowchart of a method for handling write requests, according to some aspects of the present disclosure.

In some implementations, a write request may be indicative of a first piece of data from the first set of data associated with the first set of logical addresses, where the first piece of data is associated with a first logical address from the first set of logical addresses. In response to receiving the write request, the first piece of data is assigned to a first memory block of the memory blocks having a first ID of the IDs (e.g., the first piece of data is fetched and cached into the first memory block). For example, as shown in FIG. 9, at 902, write requests may be divided by range division accelerator 608 into multiple search requests each associated with a piece of host/user data and a logical address thereof. At 904, memory block IDs may be assigned by range division accelerator 608 to the pieces of host/user data, respectively, such that each piece of host/user data may be associated with a respective memory block ID. At 906, range division accelerator 608 may trigger host interface 618 to fetch each piece of host/user data to the respective memory block using DMA.

In some implementations, in response to fetching the first piece of data to the first memory block, the L2P mapping table is updated to map the first logical address to the first ID. In response to the first piece of data is flushed from the first memory block of the cache to a memory region of the non-volatile memory device having a physical address, the L2P mapping table is updated to map the first logical address to the physical address. For example, at 908 of FIG. 9, the memory block ID where the piece of host/user data is cached may be updated by L2P search engine 610 in L2P mapping table 612 to be mapped to the logical address of the piece of host/user data. At 910, whether the non-volatile memory device programming is done may be checked. The non-volatile memory device programming may be performed by flushing the cached host/user data from the cache to the non-volatile memory device. Once the non-volatile memory device programming is done, each piece of host/user data may be stored in a respective one of memory regions each associated with a PPA. If the answer to 910 is yes, at 912, the PPA where the piece of host/user data is stored in the non-volatile memory device may be updated by L2P search engine 610 in L2P mapping table 612 to be mapped to the logical address of the piece of host/user data, replacing the memory block ID. In some implementations, the update of the L2P mapping table with the PPA may be performed before the non-volatile memory device programming is done. For example, the update of the L2P mapping table with the PPA can be performed when a command to program the piece of host/user data into the non-volatile memory device is generated, e.g., before the programming is actually done. At 914, whether new incoming write requests are received by memory controller (e.g., memory controller 300 in FIG. 3) from host (e.g., host 306 in FIG. 3) may be checked to determine whether the process may continue from 902 again for the new incoming write requests. If the answer to 910 is no, the process may proceed to 914 directly, bypassing 912 without updating L2P mapping table 612.

Figure 10:
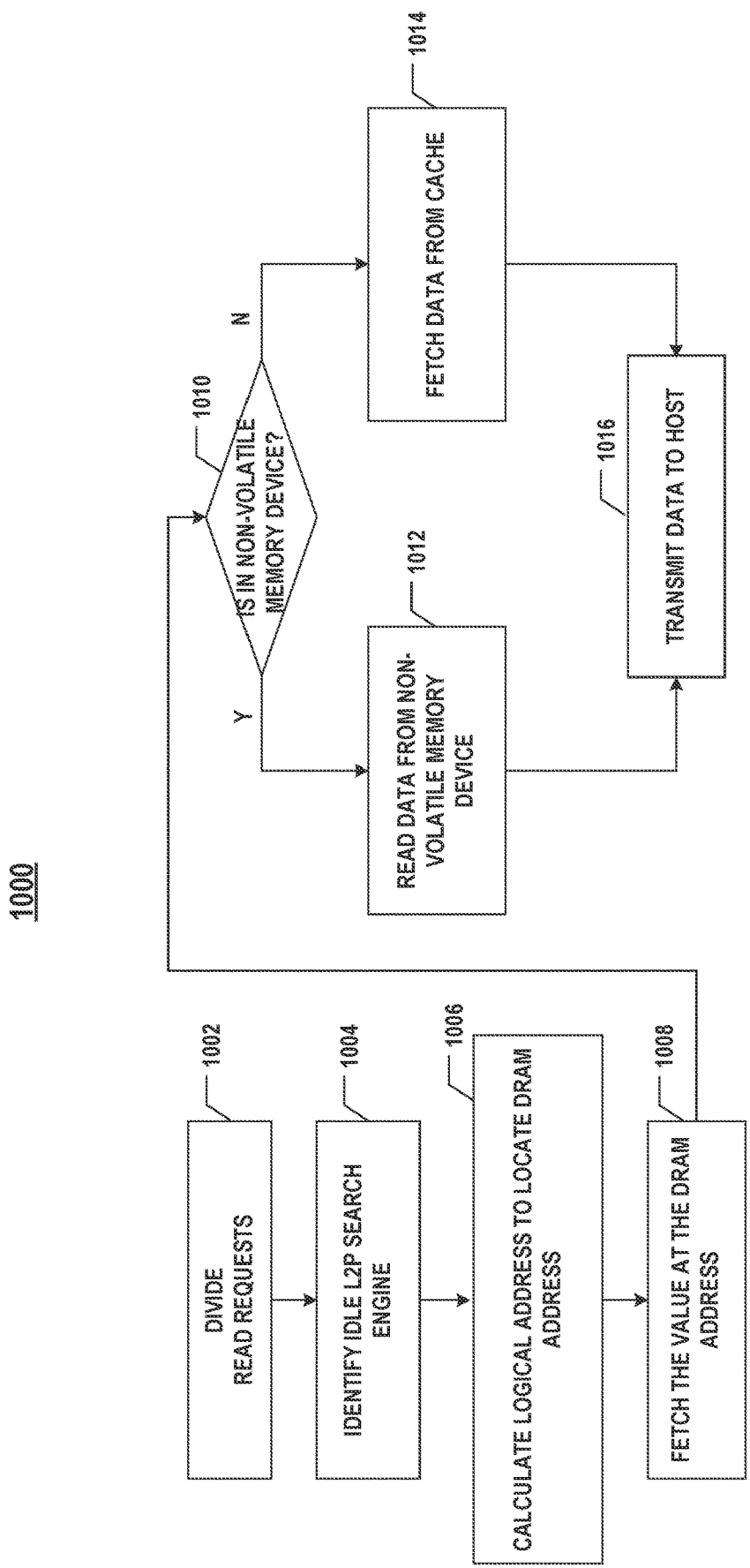
FIG. 10 illustrates a flowchart of a method for handling read requests, according to some aspects of the present disclosure.

In some implementations, a read request may be indicative of a second piece of data from the first set of data associated with the first set of logical addresses, where the second piece of data is associated with a second logical address from the first set of logical addresses. In response to receiving the read request, an address of the L2P mapping table in the volatile memory device can be determined based on the second logical address, and a second ID of the second memory block is identified at the address of the L2P mapping table in the volatile memory device. For example, as shown in FIG. 10, at 1002, read requests may be divided by range division accelerator 608 into multiple search requests each associated with a logical address. At 1004, idle L2P search engines 610 may be identified by range division accelerator 608 to perform the search requests. At 1006, the DRAM address may be located by L2P search engine 610 based on the logical address, e.g., by multiplying the logical address with an entry size A to form a product, and then adding the product to the address offset to obtain the DRAM address. At 1008, the value at the DRAM address may be fetched by L2P search engine 610.

In some implementations, in response to the value being one of the IDs of the memory blocks in the volatile memory device, the second piece of data is fetched from the second memory block of the memory blocks in the cache based on the L2P mapping table. For example, as shown in FIG. 10, at 1010, whether the piece of host/user data is in the non-volatile memory device or not may be determined based on the fetched value (either a memory block ID or a PPA, fetched at 1008). If the answer to 1010 is no, meaning that the piece of host/user data is still in the cache, at 1014, the piece of host/user data may be fetched by volatile memory interface 620 from the cache based on the fetched memory block ID at the DRAM address. If the answer to 1010 is yes, meaning that the piece of host/user data is in the non-volatile memory device, at 1012, the piece of host/user data may be read by non-volatile memory interface 622 from the non-volatile memory device based on the fetched PPA at the DRAM address. In either case, at 1016, the piece of host/user data may be transmitted to the host by host interface 618.

Figure 11A:
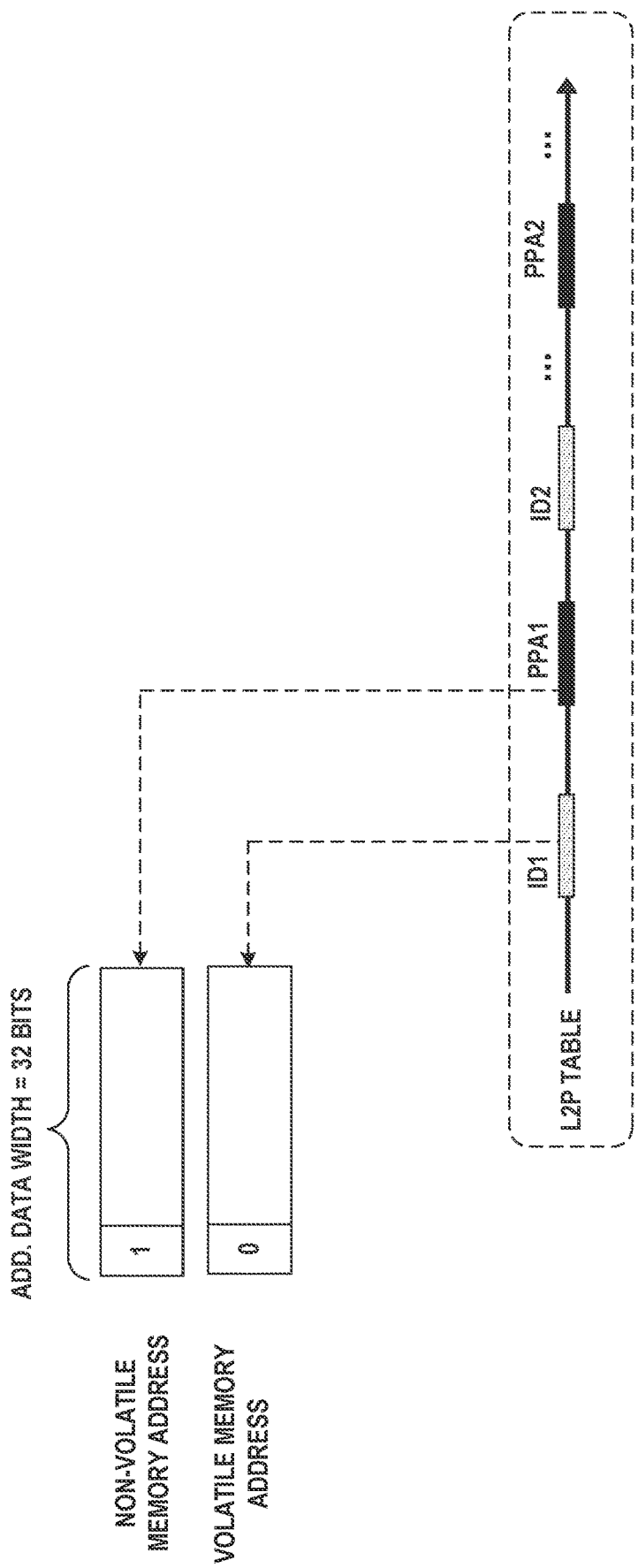
FIG. 11A illustrates an example to organize physical addresses mapped by an L2P mapping table, according to some aspects of the present disclosure.

FIG. 11A illustrates an example approach to organize physical addresses mapped by an L2P mapping table, according to some aspects of the present disclosure. As described above, the L2P mapping table may be used to map a plurality of logical addresses to a plurality of physical addresses, respectively. In the example approach of FIG. 11A, the plurality of physical addresses may be classified into either a first type of volatile memory addresses (e.g., IDs of memory blocks of a volatile memory device such as a DRAM) or a second type of non-volatile memory addresses (e.g., physical addresses of memory regions of a non-volatile memory device such as PPAs of a NAND memory device). In order to distinguish between the first type of volatile memory addresses and the second type of non-volatile memory addresses, at least one bit of an address data width can be reserved for marking the types of the physical addresses.

For example, as shown in FIG. 11A, each physical address may have an address data width of 32 bits. The most significant bit of the 32 bits can be reserved and used to mark a type of the physical address, and the remaining 31 bits can be used to express a specific value of the physical address. For example, the first type of volatile memory addresses can be identified by marking the most significant bit of each address to be "0," and the second type of non-volatile memory addresses can be identified by marking the most significant bit of each address to be "1."

By reserving the most significant bit in each address for the marking purpose, the possible size of the physical space that the address data width can express is reduced from a range of $(0, 2^{32}-1)$ to a range of $(0, 2^{31}-1)$. For an SSD (e.g., enterprise SSD) with a large storage capacity, the remaining bits of the address data width may not be sufficient to express all the physical addresses of the SSD. To improve the usage efficiency of the address data width, another example approach to organize the plurality of physical addresses mapped by the L2P mapping table is disclosed herein with combined reference to FIGS. 3, 6, and 11B.

Figure 11B:
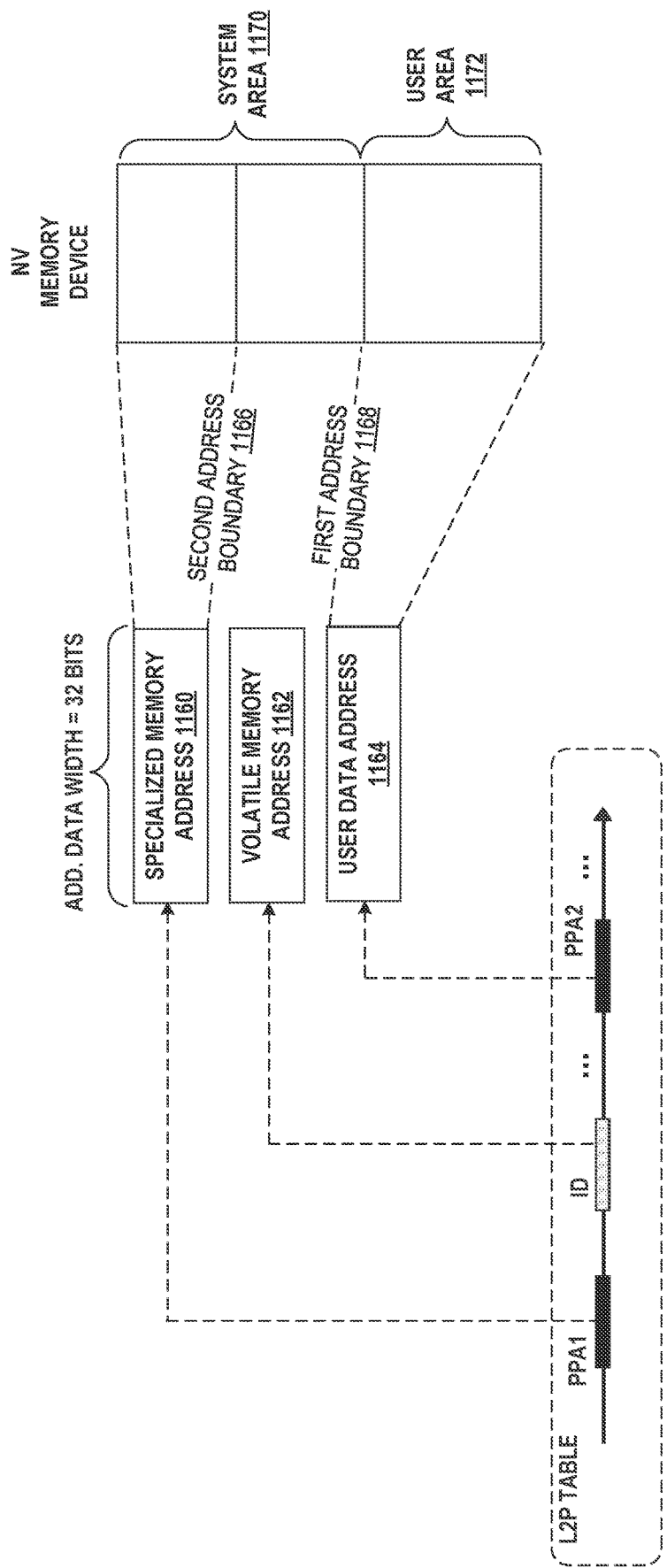
FIG. 11B illustrates another example to organize physical addresses mapped by an L2P mapping table, according to some aspects of the present disclosure.

In the example approach of FIG. 11B, the plurality of physical addresses mapped by the L2P mapping table are organized in a way different from that in the example approach of FIG. 11A. Specifically, L2P search engine 610 shown in FIG. 6 may be configured to organize the plurality of physical addresses into a plurality of address categories based on at least one address boundary. Referring to FIG. 11A, the plurality of address categories may include at least one of: (1) a first category of user data addresses 1164 mapping to memory regions of a user area 1172 of a non-volatile memory device; (2) a second category of volatile memory addresses 1162 mapping to memory blocks of a volatile memory device; or (3) a third category of specialized memory addresses 1160 mapping to memory regions of a system area 1170 of the non-volatile memory device.

Each specialized memory address 1160 in the third category may be dedicated to a particular purpose and can be mapped to a memory region in system area 1170 of the non-volatile memory device. In some implementations, a specialized memory address 1160 may be used to indicate relevant information (e.g., validity) related to data stored in physical addresses. For example, assuming that a piece of user data is already stored in a particular physical address of user area 1172 such as PPA2 (e.g., the L2P mapping table is already updated to map a first logical address to PPA2). Then, upon receiving an instruction from a host to delete the piece of user data, the memory controller may modify the L2P mapping table to map the first logical address to a specialized memory address 1160 which is set to be a particular physical address of a memory region in system area 1170 such as PPA1. In this case, specialized memory address 1160 being set to PPA1 can be used to mark the invalidity of the piece of user data associated with the first logical address. The content or the value of an entry mapping to the first logical address in the L2P mapping table is set to be the particular physical address of the memory region in system area 1170 (e.g., PPA1), and the piece of user data associated with the first logical address is identified to be invalid.

In some implementations, the at least one address boundary may include a first address boundary 1168 and a second address boundary 1166 stored in registers 330 and 332, respectively. Second address boundary 1166 and/or first address boundary 1168 may be used to determine an address category of each physical address, and can be predetermined or configured by the memory controller. Each specialized memory address 1160 in the third category can be smaller than second address boundary 1166 (e.g., specialized memory address 1160<second address boundary 1166). Each user data address 1164 in the first category can be greater than first address boundary 1168 (e.g., user data address 1164≥first address boundary 1168). Each volatile memory address 1162 in the second category can be greater than or equal to second address boundary 1166 and smaller than or equal to first address boundary 1168 (e.g., second address boundary 1166≤ volatile memory address 1162≤ first address boundary 1168).

In some implementations, the L2P mapping table may map a first set of logical addresses in the plurality of logical addresses to a first set of physical addresses associated with the memory regions of user area 1172 of the non-volatile memory device, respectively. Then, the first category of user data addresses 1164 may include the first set of physical addresses associated with the memory regions of user area 1172 of the non-volatile memory device.

The L2P mapping table may also map a second set of logical addresses in the plurality of logical addresses to IDs of the memory blocks of the volatile memory device, respectively. Then, the second category of volatile memory addresses 1162 may include the IDs of the memory blocks of the volatile memory device.

The L2P mapping table may map a third set of logical addresses in the plurality of logical addresses to a third set of physical addresses associated with the memory regions of system area 1170 of the non-volatile memory device, respectively. Then, the third category of specialized memory addresses 1160 may include the third set of physical addresses associated with the memory regions of system area 1170 of the non-volatile memory device.

In some implementations, range division accelerator 608 of FIG. 6 may generate a search request based on a read request from a host via host interface 618, and assign the search request to L2P search engine 610. The read request may be indicative of retrieving a piece of data associated with a logical address. In response to receiving the search request for the read request, L2P search engine 610 may be configured to determine an address of an entry in the L2P mapping table based on the logical address (e.g., the address of the entry=the logical address×Δ+OFF, as shown in FIG. 7). L2P search engine 610 may identify a physical address stored in the entry of the L2P mapping table based on the address of the entry. For example, the identified physical address can be the content or the value stored in the entry of the L2P mapping table.

Next, L2P search engine 610 may determine an address category which the physical address is classified into based on at least one of first address boundary 1168 or second address boundary 1166. For example, responsive to the physical address being smaller than second address boundary 1166, L2P search engine 610 may determine that the physical address is classified into the third category of specialized memory addresses 1160. Or, responsive to the physical address being greater than first address boundary 1168, L2P search engine 610 may determine that the physical address is classified into the first category of user data addresses 1164. Or, responsive to the physical address being equal to or greater than second address boundary 1166 and being equal to or smaller than first address boundary 1168, L2P search engine 610 may determine that the physical address is classified into the second category of volatile memory addresses 1162.

Then, L2P search engine 610 may instruct to fetch the piece of data from one of the volatile memory device and the non-volatile memory device based on the determined address category. Specifically, if the physical address is classified into the third category of specialized memory addresses 1160 or the first category of user data addresses 1164, L2P search engine 610 may instruct to fetch the piece of data from the non-volatile memory device using the physical address. For example, L2P search engine 610 may provide the physical address (e.g., PPA2) to non-volatile memory interface 622, such that non-volatile memory interface 622 can fetch the piece of data from the corresponding physical address in the non-volatile memory device. Or, if the physical address is classified into the second category of volatile memory addresses 1162, L2P search engine 610 may instruct to fetch the piece of data from the volatile memory device using the physical address. For example, L2P search engine 610 can provide the physical address (e.g., an identified ID) to volatile memory interface 620, such that host interface 618 can fetch the piece of data from the corresponding physical address in volatile memory device 602, for example, using DMA.

The example approach shown in FIG. 11B does not reserve any bit in the address data width for marking the different types or categories of the addresses or other purpose for the data, such that all bits in the address data width (e.g., all 32 bits) can be used to express the physical addresses of the physical space corresponding to the non-volatile memory device or the volatile memory device. Alternatively, since there is no reserving bit in the example approach of FIG. 11B, a reduced address data width (e.g., 31 bits rather than 32 bits) can be used to express the physical addresses of the physical space corresponding to the non-volatile memory device. In this case, the size of the L2P mapping table can be reduced since the physical addresses stored in the L2P mapping table are reduced to 31 bits. Therefore, the cost of the DRAM where the L2P mapping table is stored can be reduced.

Figure 12:
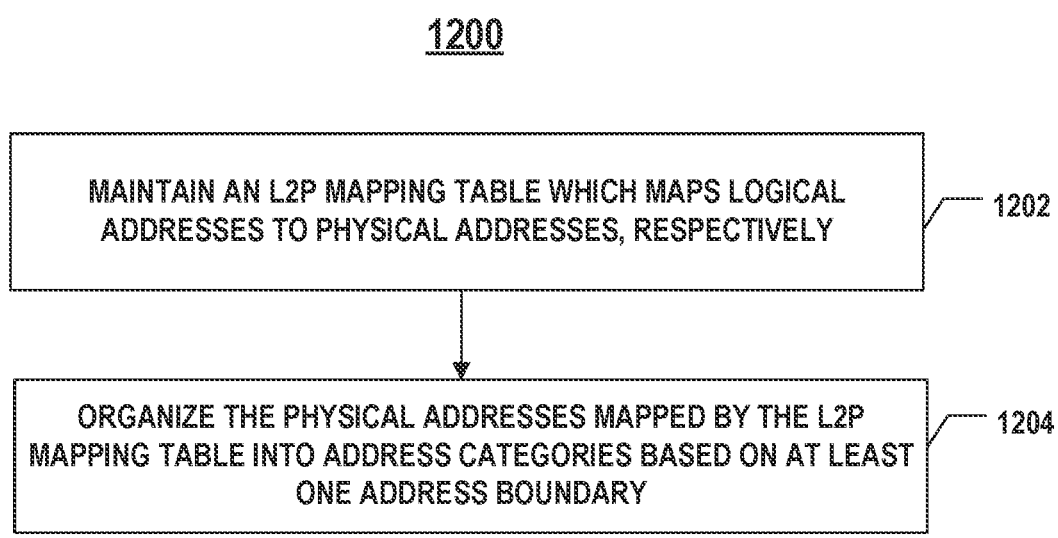
FIG. 12 illustrates a flowchart of another method for operating a memory controller, according to some aspects of the present disclosure.

FIG. 12 illustrates a flowchart of another method 1200 for operating a memory controller, according to some aspects of the present disclosure. The memory controller may be any suitable memory controller disclosed herein, such as memory controller 601. It is understood that the operations shown in method 1200 may not be exhaustive and that other operations can be performed as well before, after, or between any of the illustrated operations. Further, some of the operations may be performed simultaneously, or in a different order than shown in FIG. 12.

Referring to FIG. 12, method 1200 starts at operation 1202, in which an L2P mapping table is maintained, which maps logical addresses to physical addresses, respectively.

Method 1200 proceeds to operation 1204, as illustrated in FIG. 12, in which the physical addresses mapped by the L2P mapping table are organized into address categories based on at least one address boundary. For example, the at least one address boundary may include a first address boundary and a second address boundary. The plurality of physical addresses are organized into the following address categories based on the first address boundary and the second address boundary: (1) a first category of user data addresses mapping to memory regions of a user area of a non-volatile memory device; (2) a second category of volatile memory addresses mapping to memory blocks of a volatile memory device; or (3) a third category of specialized memory addresses mapping to memory regions of a system area of the non-volatile memory device.

Figure 13A:
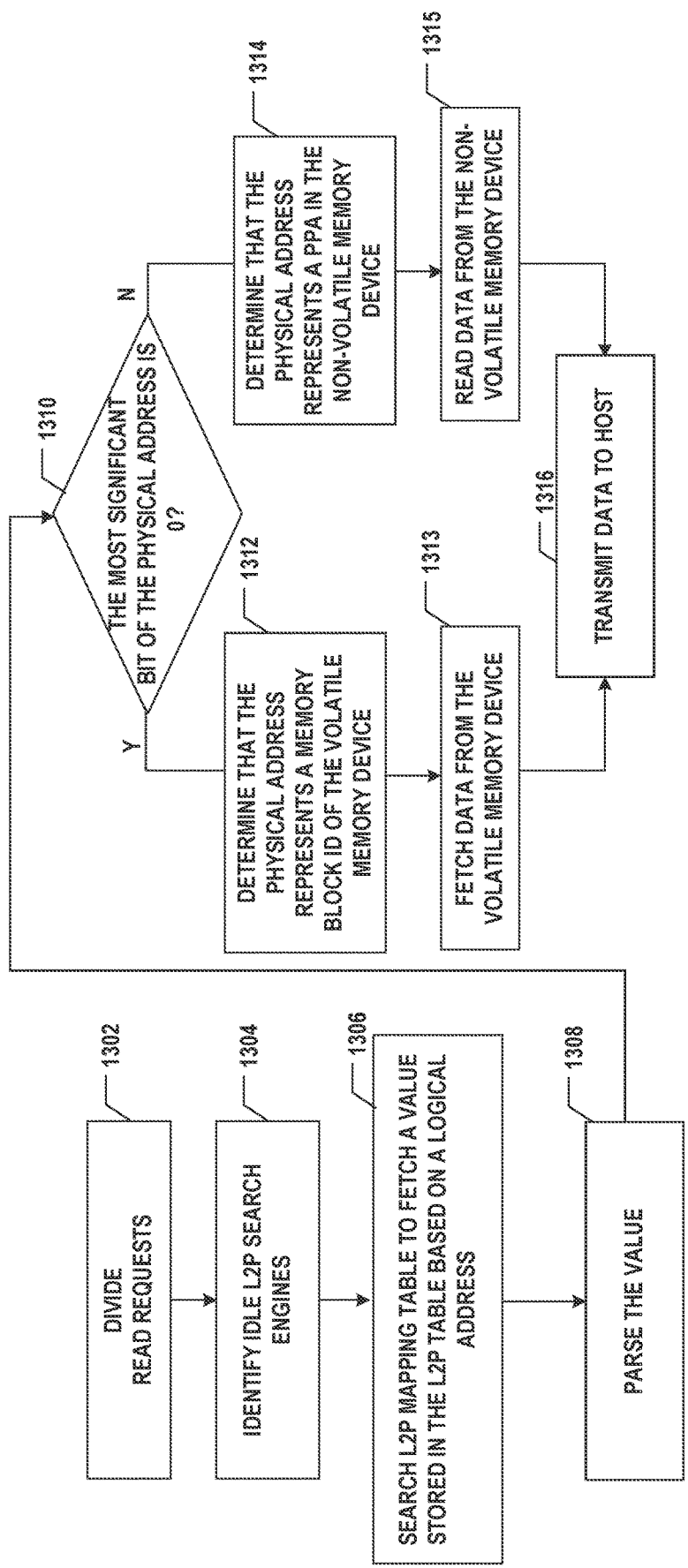
FIG. 13A illustrates a flowchart of an implementation of a method for handling a read request when physical addresses mapped by an L2P mapping table are organized using the example approach of FIG. 11A, according to some aspects of the present disclosure.

FIG. 13A illustrates a flowchart of an implementation of a method 1300 for handling a read request when physical addresses mapped by an L2P mapping table are organized using the example approach of FIG. 11A, according to some aspects of the present disclosure. Method 1300 may be performed by a memory controller, which may be any suitable memory controller disclosed herein, such as memory controller 601. It is understood that the operations shown in method 1300 may not be exhaustive and that other operations can be performed as well before, after, or between any of the illustrated operations. Further, some of the operations may be performed simultaneously, or in a different order than shown in FIG. 13A.

The memory controller is operatively coupled to a volatile memory device and a non-volatile memory device. The volatile memory device can include a cache. The cache is divided into memory blocks each has a respective unique one of IDs. The non-volatile memory device is divided into memory regions each having a respective unique one of physical addresses. For example, as shown in FIG. 6, volatile memory device 602 may include cache 606, which may be divided into memory blocks 607 each having a unique ID 614, and non-volatile memory device 604 may be divided into memory regions 605 each having a unique physical address 616.

Referring to FIG. 13A, method 1300 starts at operation 1302, in which read requests may be divided by range division accelerator 608 into multiple search requests each associated with a logical address.

Method 1300 proceeds to operation 1304, as illustrated in FIG. 13A, in which idle L2P search engines 610 may be identified by range division accelerator 608 to perform the search requests. Then, the following operations 1306-1316 may be performed for each search request.

Specifically, for a particular search request associated with a logical address, method 1300 proceeds to operation 1306, as illustrated in FIG. 13A, in which an L2P mapping table is searched to fetch a value (e.g., a physical address) stored in the L2P mapping table based on the logical address. For example, a DRAM address may be located by L2P search engine 610 based on the logical address, e.g., by multiplying the logical address with an entry size A to form a product, and then adding the product to an address offset of the L2P mapping table to obtain the DRAM address. Then, the value at the DRAM address may be fetched by L2P search engine 610.

Method 1300 proceeds to operation 1308, as illustrated in FIG. 13A, in which the value (e.g., the physical address) is parsed by L2P search engine 610. For example, L2P search engine 610 extracts the most significant bit of the physical address from the parsed value.

Method 1300 proceeds to operation 1310, as illustrated in FIG. 13A, in which it is determined whether the most significant bit of the physical address is 0. If the most significant bit of the physical address is 0, then method 1300 may proceed to operation 1312. Otherwise (e.g., the most significant bit is 1), method 1300 may proceed to operation 1314.

At operation 1312, it is determined that the physical address represents a memory block ID of the volatile memory device since the most significant bit is 0. At operation 1313, L2P search engine 610 may instruct to fetch a piece of data associated with the memory block ID from the volatile memory device. For example, the piece of data may be fetched by volatile memory interface 620 from the cache based on the memory block ID. At operation 1316, the piece of data can be transmitted to a host by host interface 618.

On the other hand, at operation 1314, it is determined that the physical address represents a PPA in the non-volatile memory device since the most significant bit is 1. At operation 1315, L2P search engine 610 may instruct to read the piece of data from the non-volatile memory device. For example, the piece of data may be read by non-volatile memory interface 622 from a NAND Flash memory device based on the PPA. The piece of data can also be transmitted to the host by host interface 618 at operation 1316.

Figure 13B:
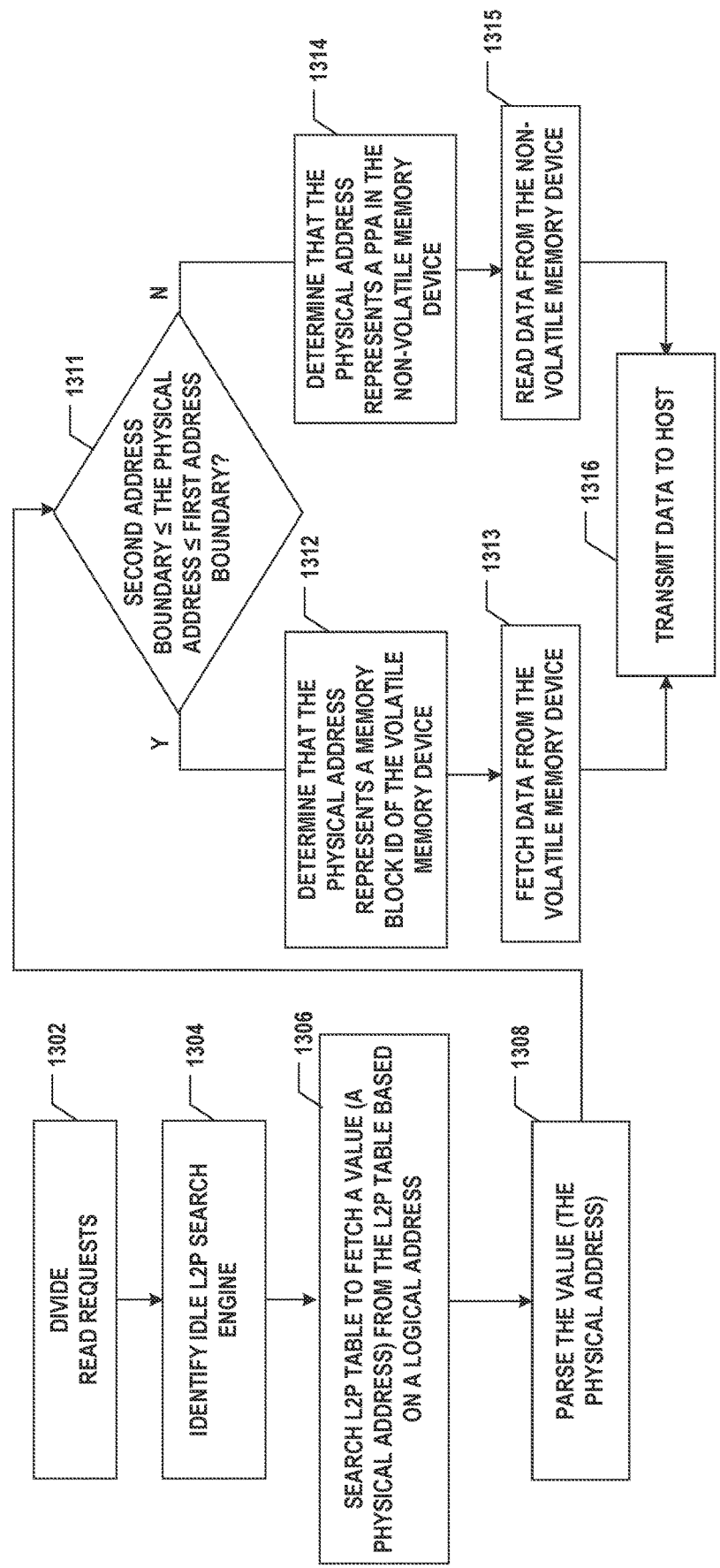
FIG. 13B illustrates a flowchart of an implementation of another method for handling a read request when physical addresses mapped by an L2P mapping table are organized using the example approach of FIG. 11B, according to some aspects of the present disclosure.

FIG. 13B illustrates a flowchart of an implementation of another method 1350 for handling a read request when physical addresses mapped by an L2P mapping table are organized using the example approach of FIG. 11B, according to some aspects of the present disclosure. Method 1350 may be performed by a memory controller, which may be any suitable memory controller disclosed herein, such as memory controller 601. It is understood that the operations shown in method 1350 may not be exhaustive and that other operations can be performed as well before, after, or between any of the illustrated operations. Further, some of the operations may be performed simultaneously, or in a different order than shown in FIG. 13B.

Method 1350 may include operations like those of method 1300 of FIG. 13A, and the description of the similar operations will not be repeated herein.

At operation 1308 of method 1350, the value (e.g., the physical address) is parsed by L2P search engine 610. For example, L2P search engine 610 may compare the value (e.g., the physical address) with at least one of a first address boundary or a second address boundary.

At operation 1311 of method 1350, L2P search engine 610 may determine whether the value (e.g., the physical address) is equal to or greater than the second address boundary and equal to or smaller than the first address boundary. If the value (e.g., the physical address) is equal to or greater than the second address boundary and equal to or smaller than the first address boundary, method 1350 may proceed to operation 1312 to determine that the value (e.g., the physical address) represents a memory block ID of the volatile memory device. Otherwise (e.g., the value is smaller than the second address boundary or greater than the first address boundary), method 1350 may proceed to operation 1314 to determine that the value (e.g., the physical address) represents a PPA in the non-volatile memory device.

In various aspects of the present disclosure, the functions described herein may be implemented in hardware, software, firmware, or any combination thereof. If implemented in software, the functions may be stored as instructions on a non-transitory computer-readable medium. Computer-readable media includes computer storage media. Storage media may be any available media that can be accessed by a memory controller, such as memory controller 601 in FIG. 6. By way of example, and not limitation, such computer-readable media can include RAM, ROM, electrically erasable programmable ROM (EEPROM), compact disc read-only memory (CD-ROM) or other optical disk storage, hard disk drive (HDD), such as magnetic disk storage or other magnetic storage devices, Flash drive, SSD, or any other medium that can be used to carry or store desired program code in the form of instructions or data structures and that can be accessed by a processing system, such as a mobile device or a computer. Disk and disc, as used herein, includes CD, laser disc, optical disc, digital video disc (DVD), and floppy disk where disks usually reproduce data magnetically, while discs reproduce data optically with lasers. Combinations of the above should also be included within the scope of computer-readable media.

The foregoing description of the specific implementations can be readily modified and/or adapted for various applications. Therefore, such adaptations and modifications are intended to be within the meaning and range of equivalents of the disclosed implementations, based on the teaching and guidance presented herein.

The breadth and scope of the present disclosure should not be limited by any of the above-described example implementations, but should be defined only in accordance with the following claims and their equivalents.

Although specific configurations and arrangements are discussed, it should be understood that this is done for illustrative purposes only. As such, other configurations and arrangements can be used without departing from the scope of the present disclosure. Also, the subject matter as described in the present disclosure can also be used in a variety of other applications. Functional and structural features as described in the present disclosures can be combined, adjusted, modified, and rearranged with one another and in ways that are consistent with the scope of the present disclosure.

What is claimed is:

1. A memory controller, comprising:
a logical-to-physical (L2P) search engine configured to:
maintain an L2P mapping table that maps logical addresses to physical addresses, respectively; and
compare the physical addresses mapped by the L2P mapping table with at least one address boundary to organize the physical addresses into address categories comprising a first category of user data addresses associated with a user area of a non-volatile memory device, a second category of volatile memory addresses associated with a volatile memory device, and a third category of specialized memory addresses associated with a system area of the non-volatile memory device,
wherein when one or more first logical addresses of the logical addresses are mapped to a specialized address in the third category of specialized addresses, data associated with the one or more first logical addresses is marked as invalid.

2. The memory controller of claim 1, wherein:
the at least one address boundary comprises a first address boundary; and
the memory controller further comprises a first register configured to store the first address boundary.

3. The memory controller of claim 2, wherein the first category of user data addresses maps to memory regions of the user area of the non-volatile memory device, and the second category of volatile memory addresses maps to memory blocks of the volatile memory device.

4. The memory controller of claim 3, wherein:
the L2P mapping table maps a first set of logical addresses in the logical addresses to a first set of physical addresses associated with the memory regions of the user area of the non-volatile memory device, respectively, and the first category of user data addresses comprises the first set of physical addresses associated with the memory regions of the user area of the non-volatile memory device; and
the L2P mapping table also maps a second set of logical addresses in the logical addresses to identifiers (IDs) of the memory blocks of the volatile memory device, respectively, and the second category of volatile memory addresses comprises the IDs of the memory blocks of the volatile memory device.

5. The memory controller of claim 3, wherein:
each user data address in the first category is greater than the first address boundary; and
each volatile memory address in the second category is smaller than the first address boundary.

6. The memory controller of claim 3, wherein:
the at least one address boundary further comprises a second address boundary lower than the first address boundary; and the memory controller further comprises a second register configured to store the second address boundary.

7. The memory controller of claim 6, wherein:
the third category of specialized memory addresses maps to memory regions of the system area of the non-volatile memory device; and
the L2P mapping table also maps a third set of logical addresses in the logical addresses to a third set of physical addresses associated with the memory regions of the system area of the non-volatile memory device, respectively, and the third category of specialized memory addresses comprises the third set of physical addresses associated with the memory regions of the system area of the non-volatile memory device.

8. The memory controller of claim 7, wherein
each volatile memory address in the second category is greater than or equal to the second address boundary and smaller than or equal to the first address boundary; and
each specialized memory address in the third category is smaller than the second address boundary.

9. The memory controller of claim 3, further comprising a volatile memory device interface operatively coupled to the volatile memory device and a non-volatile memory device interface operatively coupled to the non-volatile memory device.

10. The memory controller of claim 3, wherein the volatile memory device comprises dynamic random-access memory (DRAM), and the non-volatile memory device comprises NAND Flash memory.

11. The memory controller of claim 8, wherein responsive to a read request indicative of retrieving a piece of data associated with a second logical address, the L2P search engine is further configured to:
determine an address of an entry in the L2P mapping table based on the second logical address;
identify a physical address stored in the entry of the L2P mapping table based on the address of the entry;
determine an address category which the physical address is classified into based on the first address boundary and the second address boundary; and
instruct to fetch the piece of data from one of the volatile memory device and the non-volatile memory device based on the address category.

12. The memory controller of claim 11, wherein to determine the address category, the L2P search engine is further configured to:
responsive to the physical address being greater than the first address boundary, determine that the physical address is classified into the first category of user data addresses mapping to the memory regions of the user area of the non-volatile memory device;
responsive to the physical address being lower than the second address boundary, determine that the physical address is classified into the third category of specialized memory addresses mapping to the memory regions of the system area of the non-volatile memory device; or
responsive to the physical address being equal to or greater than the second address boundary and being equal to or smaller than the first address boundary, determine that the physical address is classified into the second category of volatile memory addresses mapping to the memory blocks of the volatile memory device.

13. The memory controller of claim 12, wherein to instruct to fetch the piece of data, the L2P search engine is further configured to:

responsive to the physical address being classified into the third category of specialized memory addresses or the first category of user data addresses, instruct to read the piece of data from the non-volatile memory device using the physical address; or
responsive to the physical address being classified into the second category of volatile memory addresses, instruct to fetch the piece of data from the volatile memory device using the physical address.

14. A memory system, comprising:
a non-volatile memory device comprising memory regions each associated with a physical address;
a memory controller operatively coupled to the non-volatile memory device and configured to control the non-volatile memory device, the memory controller comprising a logical-to-physical (L2P) search engine configured to:
maintain an L2P mapping table that maps logical addresses to physical addresses, respectively; and
compare the physical addresses mapped by the L2P mapping table with at least one address boundary to organize the physical addresses into address categories comprising a first category of user data addresses associated with a user area of a non-volatile memory device, a second category of volatile memory addresses associated with a volatile memory device, and a third category of specialized memory addresses associated with a system area of the non-volatile memory device,
wherein when one or more logical addresses of the logical addresses are mapped to a specialized address in the third category of specialized addresses, data associated with the one or more logical addresses is marked as invalid.

15. The memory system of claim 14, wherein:
the at least one address boundary comprises a first address boundary; and
the memory controller further comprises a first register configured to store the first address boundary.

16. The memory system of claim 15, wherein the first category of user data addresses maps to memory regions of the user area of the non-volatile memory device, and the second category of volatile memory addresses maps to memory blocks of the volatile memory device.

17. A method for operating a memory controller, comprising:
maintaining a logical-to-physical (L2P) mapping table that maps logical addresses to physical addresses, respectively; and
comparing the physical addresses mapped by the L2P mapping table with at least one address boundary to organize the physical addresses into address categories comprising a first category of user data addresses associated with a user area of a non-volatile memory device, a second category of volatile memory addresses associated with a volatile memory device, and a third category of specialized memory addresses associated with a system area of the non-volatile memory device,
wherein when one or more logical addresses of the logical addresses are mapped to a specialized address in the third category of specialized addresses, data associated with the one or more logical addresses is marked as invalid.

18. The method of claim 17, wherein the at least one address boundary comprise a first address boundary stored in a first register.

19. The method of claim 18, wherein the first category of user data addresses maps to memory regions of the user area of the non-volatile memory device, and the second category of volatile memory addresses maps to memory blocks of the volatile memory device.

20. The method of claim 19, wherein:
- the L2P mapping table maps a first set of logical addresses in the logical addresses to a first set of physical addresses associated with the memory regions of the user area of the non-volatile memory device, respectively, and the first category of user data addresses comprises the first set of physical addresses associated with the memory regions of the user area of the non-volatile memory device; and
- the L2P mapping table also maps a second set of logical addresses in the logical addresses to identifiers (IDs) of the memory blocks of the volatile memory device, respectively, and the second category of volatile memory addresses comprises the IDs of the memory blocks of the volatile memory device.

* * * * *